(12) United States Patent
Boblett et al.

(10) Patent No.: US 12,530,031 B2
(45) Date of Patent: Jan. 20, 2026

(54) VIRTUAL OFF-ROADING GUIDE

(71) Applicant: Rivian IP Holdings, LLC, Plymouth, MI (US)

(72) Inventors: Brennan Matthew Boblett, Orinda, CA (US); Jason Meyer Quint, Ann Arbor, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 388 days.

(21) Appl. No.: 17/943,058

(22) Filed: Sep. 12, 2022

(65) Prior Publication Data

US 2024/0085920 A1   Mar. 14, 2024

(51) Int. Cl.
  *G05D 1/00* (2024.01)
  *B60W 30/10* (2006.01)

(52) U.S. Cl.
  CPC .......... *G05D 1/0221* (2013.01); *B60W 30/10* (2013.01)

(58) Field of Classification Search
  CPC .... G05D 1/0221; B60W 30/10; B60W 50/14; B60W 2050/146; B60W 50/0098; B60W 2050/0085; B60W 2556/45
  See application file for complete search history.

(56) References Cited

U.S. PATENT DOCUMENTS

| | | | | |
|---|---|---|---|---|
| 11,307,586 B2 * | 4/2022 | James | ............... | B60W 60/0053 |
| 2005/0038595 A1 * | 2/2005 | Yokota | ................... | G01C 21/26 701/454 |
| 2017/0320495 A1 * | 11/2017 | Lu | ......................... | B60W 50/10 |
| 2021/0237581 A1 * | 8/2021 | Rajaie | ....................... | B60T 7/18 |
| 2021/0293575 A1 * | 9/2021 | Arcos | ................. | G07C 5/0841 |

(Continued)

FOREIGN PATENT DOCUMENTS

| | | | | |
|---|---|---|---|---|
| GB | 2578911 A * | 6/2020 | ........ | B60W 60/0051 |
| JP | 6950546 B2 * | 10/2021 | ............ | B60W 30/12 |
| WO | WO-2014027109 A1 * | 2/2014 | ............. | B60T 8/175 |

OTHER PUBLICATIONS

"Discover Millions of Routes with the New Public Tracks Overlay" NPL 2021 (Year: 2021).*

(Continued)

*Primary Examiner* — Rachid Bendidi
*Assistant Examiner* — Joseph Anderson Yanoska
(74) *Attorney, Agent, or Firm* — Patterson + Sheridan, LLP

(57) ABSTRACT

Particular embodiments may provide a virtual off-road guide for a learning vehicle. In some embodiments, a control system for a learning vehicle comprises one or more processors and a memory coupled to the processors comprising instructions executable by the processors, the processors being operable when executing the instructions to receive a trace of an off-road trail traversed by a precedent vehicle and corresponding trace parameters; in response to receiving the trace parameters, adjusting one or more driving parameters of the learning vehicle based on the trace parameters; and providing instructions for traversing the trace based on the trace parameters. In some embodiments, the trace parameters comprise location, orientation, relative position along the off-road trail, ride height, drive mode, brake regeneration level, steering angle, power consumption, acceleration, or torque.

16 Claims, 24 Drawing Sheets

(56) References Cited

U.S. PATENT DOCUMENTS

2022/0332317 A1* 10/2022 Lewandowski ..... B60W 30/146

OTHER PUBLICATIONS

"Turn-By-Turn Directions Now Available on Gaia GPS" NPL 2021 (Year: 2021).*
"Gaia Overland: One Map to Rule Them All" NPL 2022 (Year: 2022).*
"Gaia GPS and Apple CarPlay Bring Outdoor Maps to Your Dashboard" NPL 2020 (Year: 2020).*

* cited by examiner

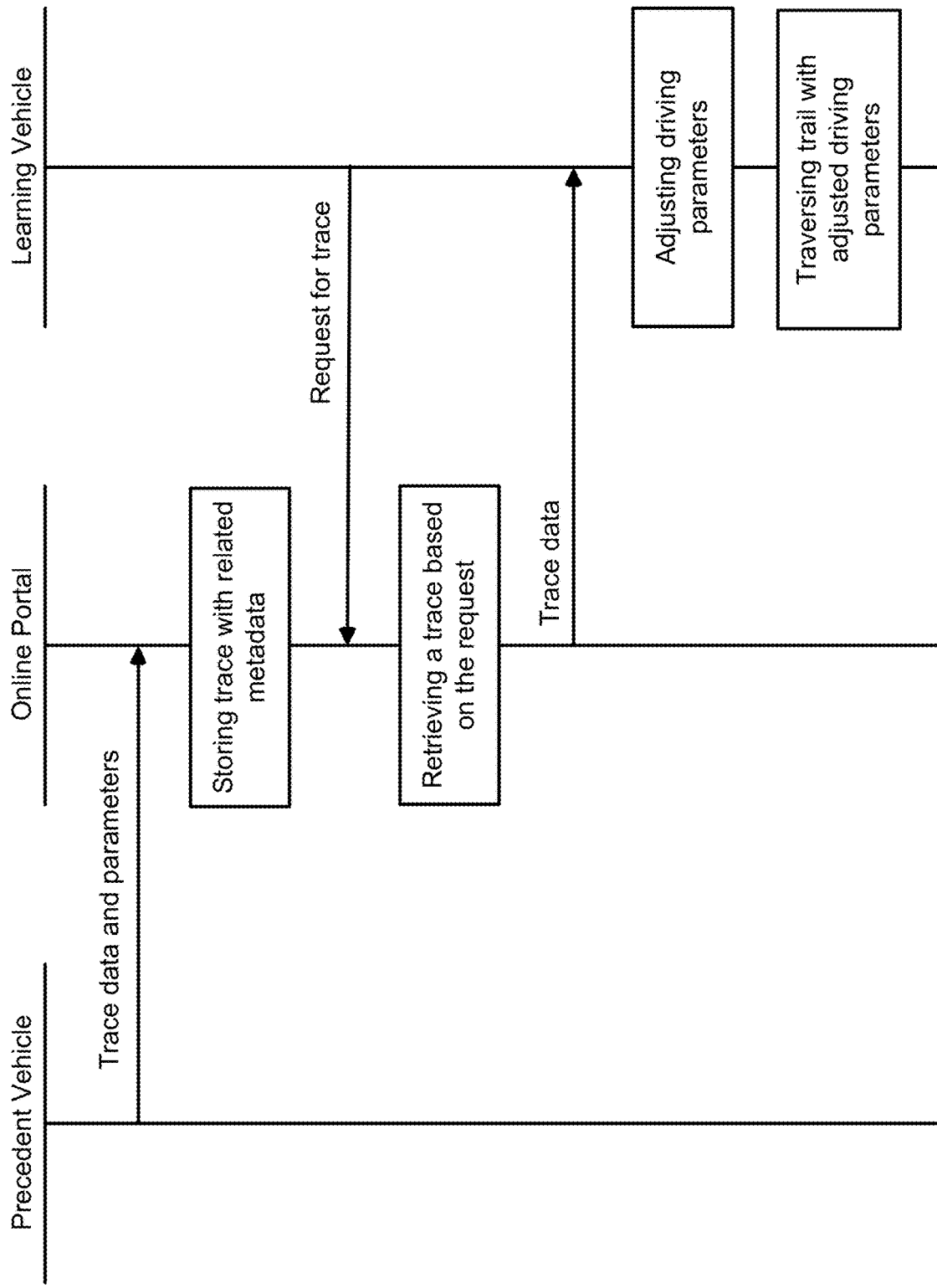

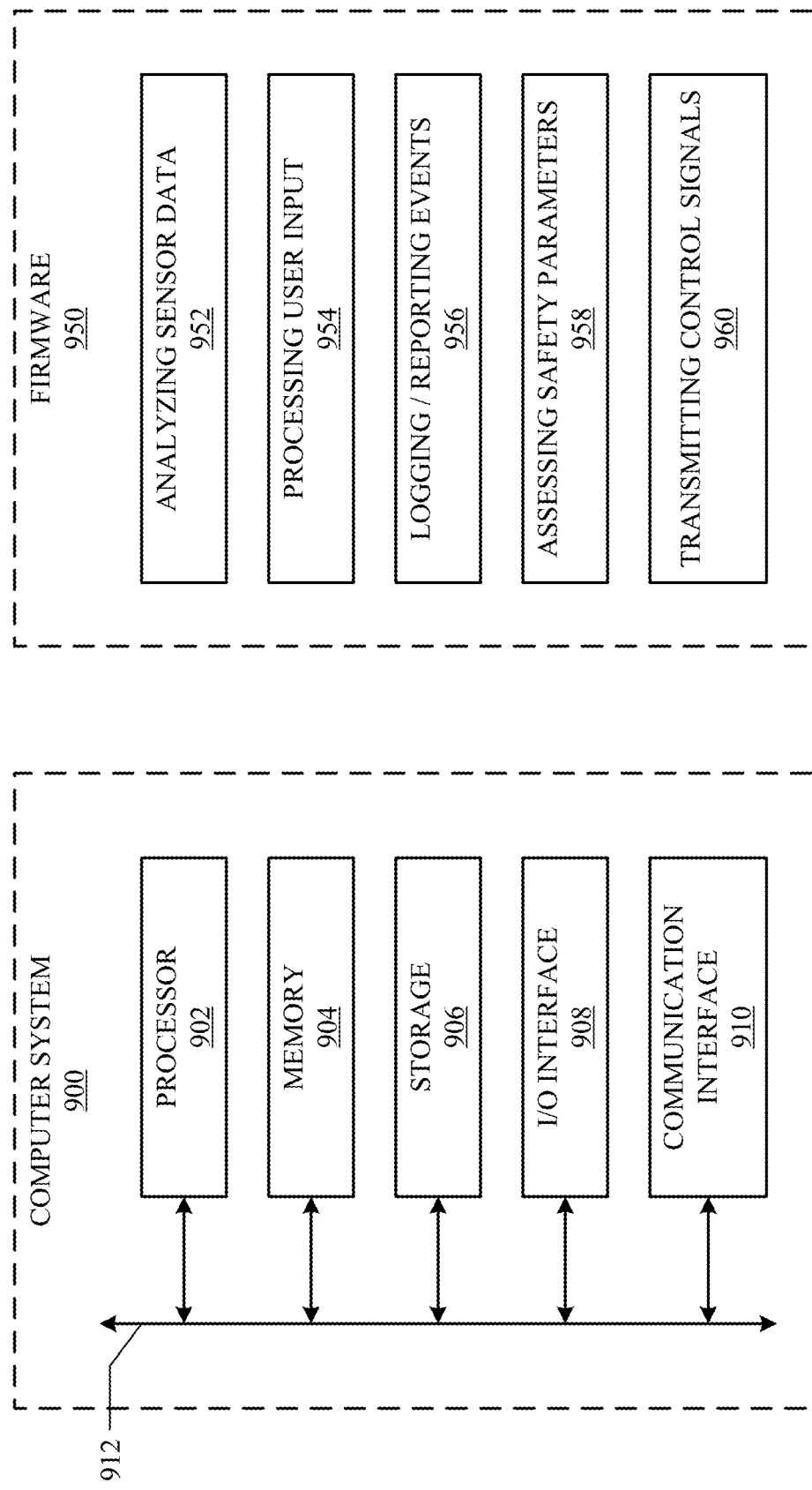

VIRTUAL OFF-ROADING GUIDE

INTRODUCTION

Effective execution of a virtual off-roading guide may be important to the success of a learning vehicle driver and the off-roading community. Virtual off-road guides may be complicated by the lack of data available for off-road trails. Each off-road trail is so unique to the underlying terrain that it may be hard for a learning vehicle driver to begin exploring such trails without a precedent driver available to teach them. In some instances, the off-road drivers may want to traverse off-road trails, but may not want to manually adjust every driving parameter.

BRIEF SUMMARY

Systems and methods for a virtual off-roading vehicle guide are disclosed. In some embodiments, the systems and methods allow a control system for a learning vehicle to receive a trace of an off-road trail and guide the learning vehicle through the trail by providing instructions based on trace parameters or adjusting driving parameters. The virtual off-roading guide may be used so that learning vehicles can learn how to traverse off-road trails. In some embodiments, a precedent vehicle will upload a trace while the precedent vehicle traverses the off-road trail or after the precedent vehicle finishes traversing the off-road trail. The instructions for traversing the trace of the off-road trail may be displayed on a center display, a heads up display, a driver display, or other visual components of the learning vehicle. Operating a virtual off-roading guide in this manner may allow a community of drivers to share off-road trails with one another.

In some embodiments, a control system for a learning vehicle comprises one or more processors and a memory coupled to the processors comprising instructions executable by the processors. The processors may be operable to execute the instructions to perform operations which may comprise receiving a trace of an off-road trail traversed by a precedent vehicle and corresponding trace parameters; in response to receiving the trace parameters, adjusting one or more driving parameters of the learning vehicle based on the trace parameters; and providing instructions for traversing the trace based on the trace parameters.

In certain embodiments, the trace parameters may comprise the precedent vehicle's location, orientation, relative position along the off-road trail, ride height, drive mode, brake regeneration level, steering angle, power consumption, acceleration, torque, or tire pressure. The adjusted one or more driving parameters of the learning vehicle may comprise ride height, drive mode, and brake regeneration level. In addition, the learning vehicle may enable an advanced driver assistance system and the adjusted one or more driving parameters may further comprise steering angle, acceleration, or torque. Adjusting the driving parameters may comprise configuring the driving parameters to match the trace parameters of the precedent vehicle based on measurements detected using sensors of the learning vehicle. Sensor measurements from the learning vehicle may comprise acceleration, torque, acceleration pedal angle, steering angle, brake pedal angles, roll, pitch, altitude, heading, or location.

In some aspects, the instructions provided by the control system are provided in audio, visual, or haptic format. The visual instructions may be displayed on a center display, a heads up display, a driver display, or other visual components of the learning vehicle. Other visual components may include lights or other indicators.

In some implementations of the control system, the control system may receive the trace by downloading the trace to the learning vehicle. The control system may receive the trace by receiving a transmission of the trace while the learning vehicle traverses the off-road trail. The trace may be uploaded to an online portal while the precedent vehicle traverses the off-road trail or after the precedent vehicle finishes traversing the off-road trail.

In some aspects, a method for a learning vehicle comprises receiving a trace of an off-road trail traversed by a precedent vehicle and corresponding trace parameters; in response to receiving the trace parameters, adjusting one or more driving parameters of the learning vehicle based on the trace parameters; and providing instructions for traversing the trace based on the trace parameters. The trace parameters may comprise the precedent vehicle's location, orientation, relative position along the off-road trail, ride height, drive mode, brake regeneration level, steering angle, power consumption, acceleration, or torque. The adjusted one or more driving parameters of the learning vehicle may comprise ride height, drive mode, and brake regeneration level. In some implementations of the method, the learning vehicle may enable an advanced driver assistance system, and wherein the adjusted one or more driving parameters further comprise steering angle, acceleration, or torque. In some embodiments, adjusting the driving parameters may comprise configuring the driving parameters to match the trace parameters of the precedent vehicle based on measurements detected using sensors of the learning vehicle.

In some aspects, a non-transitory computer-readable medium stores instructions that, when executed by one or more processors, cause the one or more processors to execute a method comprising receiving a trace of an off-road trail traversed by a precedent vehicle and corresponding trace parameters; in response to receiving the trace parameters, adjusting one or more driving parameters of the learning vehicle based on the trace parameters; and providing instructions for traversing the trace based on the trace parameters. Adjusting the driving parameters may comprise configuring the driving parameters to match the trace parameters of the precedent vehicle based on measurements detected using sensors of the learning vehicle. Receiving the trace may comprise downloading the trace to the learning vehicle. Alternatively or additionally, receiving the trace may comprise receiving a transmission of the trace while the learning vehicle traverses the off-road trail. The trace may be uploaded to an online portal while the precedent vehicle traverses the off-road trail or after the precedent vehicle finishes traversing the off-road trail.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 is a diagram illustrating exchanges between a precedent vehicle, an online portal, and a learning vehicle.

FIG. 9A is a schematic of an example computer system.

FIG. 9B illustrates example firmware for a vehicle ECU.

DETAILED DESCRIPTION

Figure 1A:
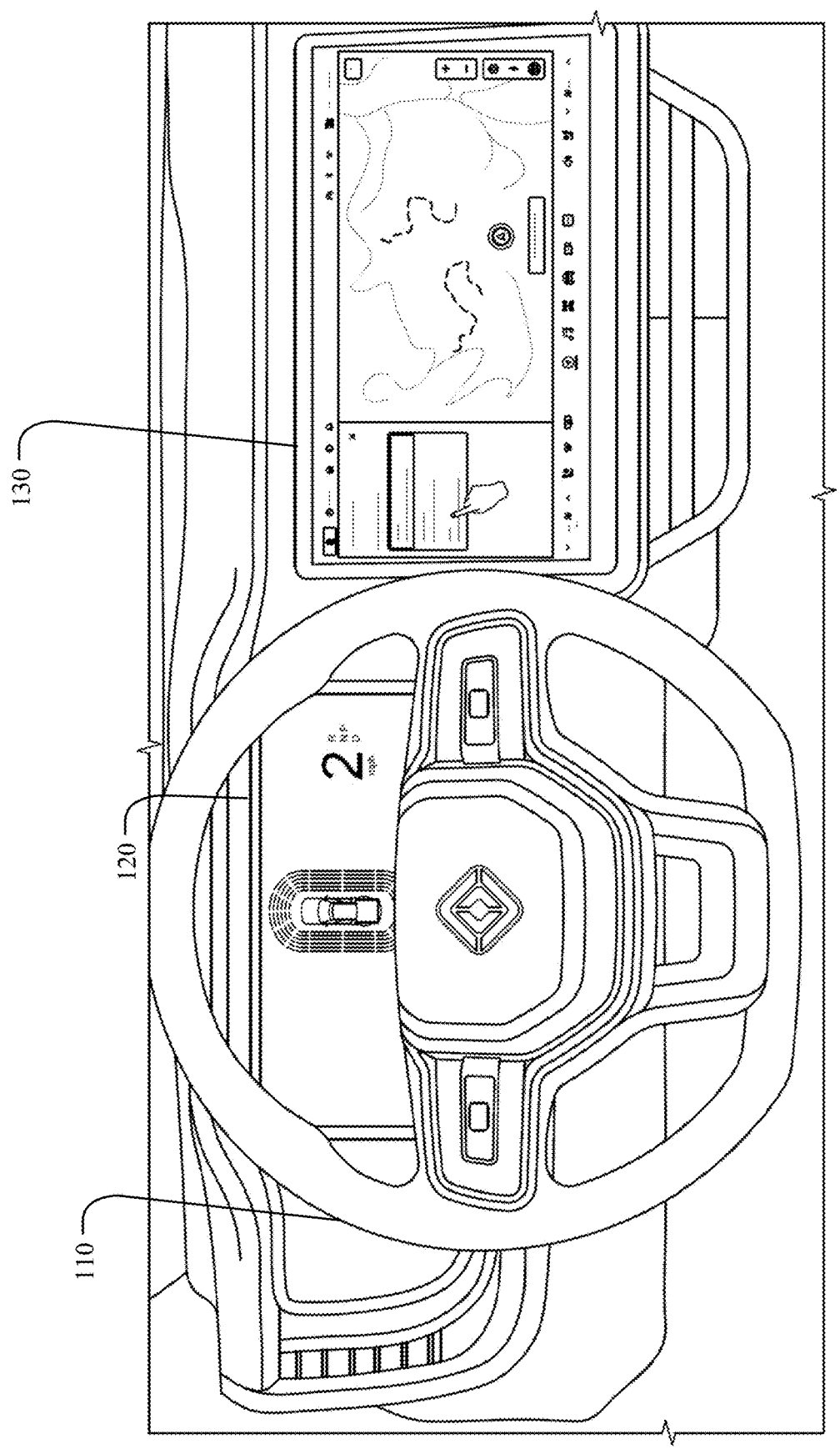
FIG. 1A illustrates a driver cockpit, including a center display and driver display for providing instructions to a driver of a learning vehicle for traversing a trace.

Embodiments of the present invention are directed to vehicle control systems, methods, and computer readable media for providing instructions for a learning vehicle by receiving a trace of an off-road trail traversed by a precedent vehicle, adjusting one or more driving parameters of the learning vehicle based on the trace parameters, and providing instructions for traversing the trace based on the trace parameters. The off-road trail may be an unpaved or unsurfaced trail, the traversal of which may include scaling rocks, ascending muddy slopes, or crossing water. Terrain of the off-road trail may include sand, gravel, mud, rocks, or other natural topography.

In some embodiments, a learning vehicle is a vehicle being driven by a person who seeks instructions for traversing an off-road trail. A precedent vehicle may be a vehicle that traversed an off-road trail while being driven by another driver (possibly with off-roading experience). The precedent vehicle may take measurements using sensors while traversing an off-road trail. The sensors may include cameras, gyroscopes, altimeters, GPS, or magnetic compasses. The measurements taken may include acceleration, torque, acceleration pedal angle, steering angle, brake pedal angles, roll, pitch, altitude, heading, or location of the precedent vehicle.

In some embodiments, upon completion of an off-road trail, the precedent vehicle may upload the trace of that trail to an online portal. The trace may comprise directions regarding how to traverse the off-road trail. The trace may comprise trace parameters. The learning vehicle may receive the trace by either downloading the trace all at once, or receiving a transmission of the trace in stages as the learning vehicle traverses the trail.

In some embodiments, trace parameters comprise the precedent vehicle's location, orientation, or relative position along an off-road trail. Trace parameters may comprise the precedent vehicle's ride height, the distance between the base of the precedent vehicle's tire and the underside of the precedent vehicle's chassis. Trace parameters may comprise the precedent vehicle's drive modes, pre-set settings that may control the sensitivity of the accelerator pedal, the ride height, suspension stiffness, the regenerative braking response, stability control, and all-wheel drive. Trace parameters may comprise the precedent vehicle's brake regeneration level, a measurement of how much a vehicle's kinetic energy is being converted by the vehicle's regenerative braking system. The brake regeneration level may determine how fast the precedent vehicle decelerates when there is no input to the vehicle's accelerator pedal. Trace parameters may comprise the precedent vehicle's steering angle. Steering angle may be either the angle between a longitudinal axis of the precedent vehicle and the direction of the wheels or the angle of the steering wheel. Trace parameters may comprise the precedent vehicle's power consumption, the amount of power consumed by the vehicle as it traversed the off-road trail. Trace parameters may comprise the degree of acceleration at particular points along the off-road trail. Trace parameters may comprise the precedent vehicle's torque.

In some embodiments, driving parameters comprise the learning vehicle's location, orientation, or relative position along an off-road trail. Driving parameters may comprise the learning vehicle's ride height, the distance between the base of the learning vehicle's tire and the underside of the learning vehicle's chassis. Driving parameters may comprise the learning vehicle's drive modes, pre-set settings that may control the sensitivity of the accelerator pedal, the ride height, suspension stiffness, the regenerative braking response, stability control, and all-wheel drive. Driving parameters may comprise the learning vehicle's brake regeneration level, a measurement of how much a vehicle's kinetic energy is being converted by the vehicle's regenerative braking system. The brake regeneration level may determine how fast the learning vehicle decelerates when there is no input to the vehicle's accelerator pedal. Driving parameters may comprise the learning vehicle's steering angle. Steering angle may be either the angle between a longitudinal axis of the learning vehicle and the direction of the wheels or the angle of the steering wheel. Driving parameters may comprise the degree of acceleration at particular points along the off-road trail. Driving parameters may comprise the learning vehicle's torque.

Figure 1B:
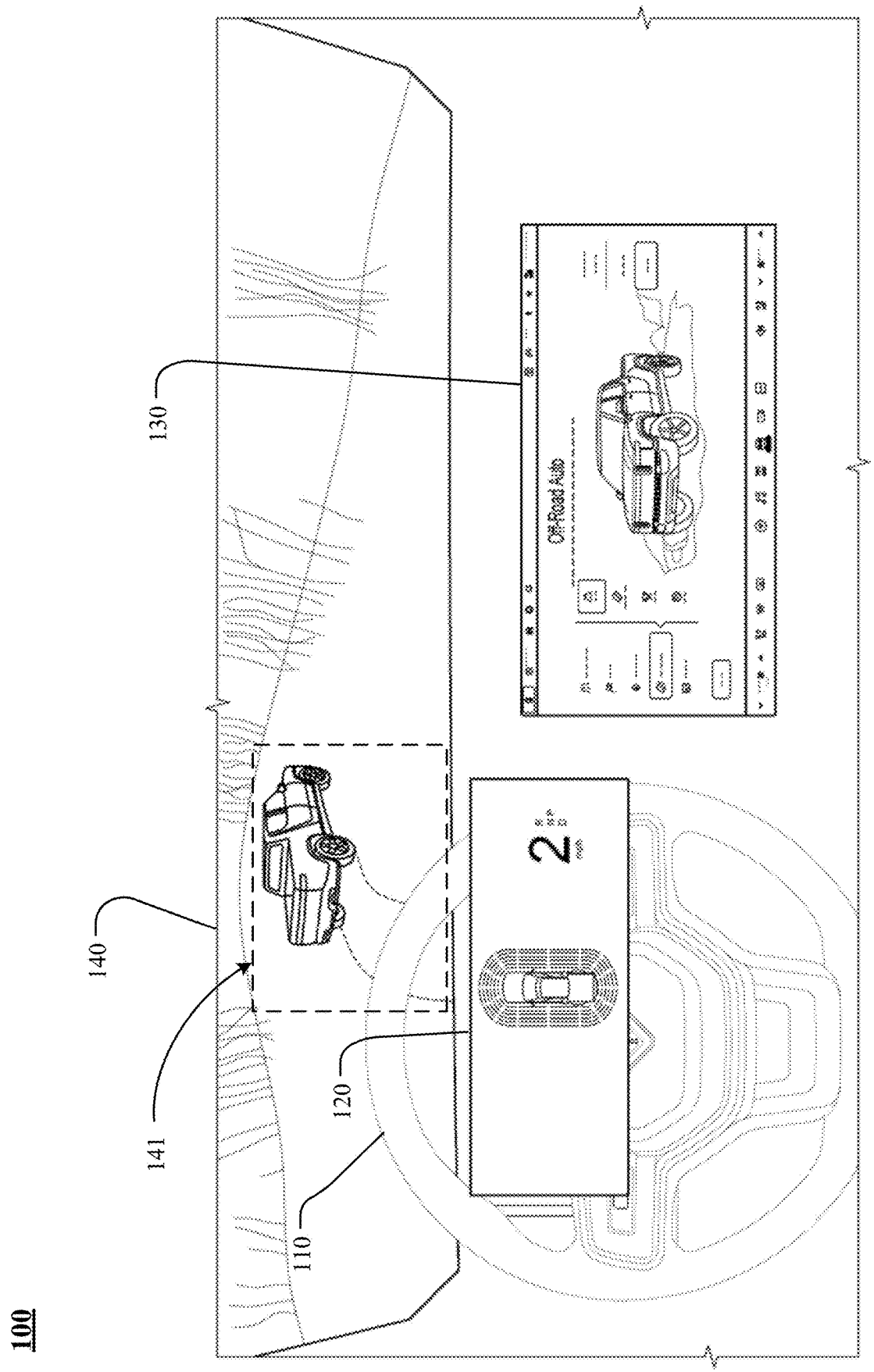
FIG. 1B illustrates a driver cockpit, including a center display, driver display, and heads-up display for providing instructions to a driver of a learning vehicle for traversing a trace.

FIGS. 1A-1B illustrate an overview of an example driver cockpit 100 for providing instructions to a driver of a learning vehicle for traversing a trace of an off-road trail. FIG. 1A illustrates the physical elements in driver cockpit 100, including a steering wheel 110, a driver display 120, and a center display 130. FIG. 1B illustrates the driver cockpit illustrated in FIG. 1A with the addition of windshield 140, where a heads-up display 141 may be projected. The instructions for traversing the trace may be provided in audio, visual, or haptic format. In some embodiments, the visual instructions are displayed on driver display 120, positioned behind steering wheel 110 and visible from the driver seat. Driver display 120 may be a touch screen. The visual instructions may be displayed on center display 130, positioned in or above a center console, and visible from both the driver and passenger seat. Center display 130 may be a touch screen. The visual instructions may be displayed on a heads-up display 141 projected onto windshield 140, and visible to the driver as they look out the windshield. The instructions as presented on driver display 120, center display 130, and/or heads-up display 141 may include different types of related information on each of the displays in order to provide an enhanced driver experience. Non-limiting examples of the types of information that may be displayed include: a static image of the precedent vehicle or a dynamic image that reflects the precedent vehicle's ride height, suspension travel of each wheel, steering angle, etc. as it changes while traversing the trail.

Figure 2:
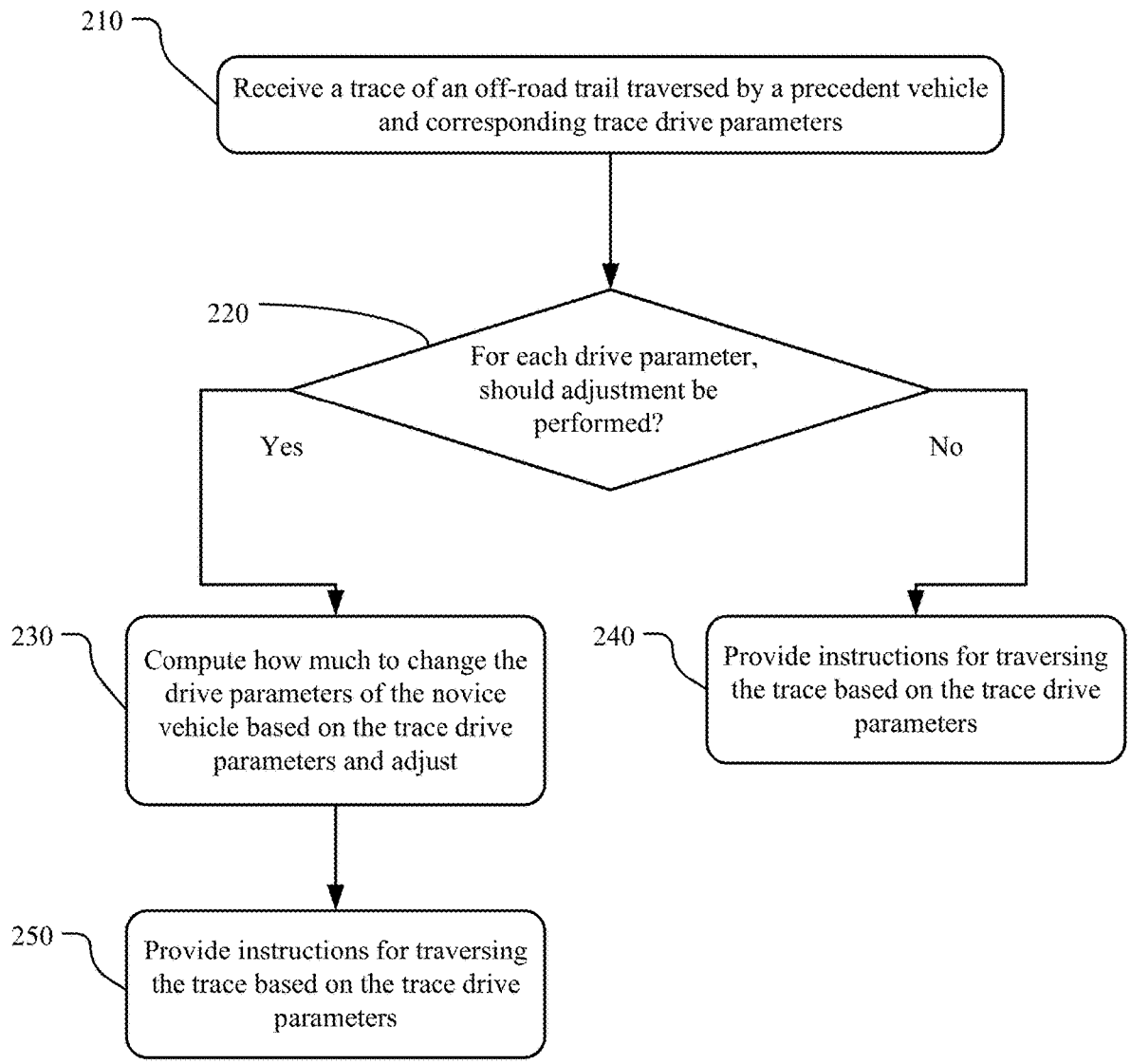
FIG. 2 is a flowchart illustrating steps of a method for providing learning mode instructions and adjusting driving parameters when a learning vehicle has received a trace of an off-road trail.

FIG. 2 is a flowchart illustrating steps of a method 200 for providing learning mode instructions and adjusting driving parameters when a learning vehicle has received a trace of an off-road trail. Method 200 may begin at step 210 when a trace of an off-road trail traversed by a precedent vehicle and corresponding trace parameters are received. At decision point 220, the control module may determine whether, for each driving parameter, adjustment should be performed. If yes, method 200 may then continue at step 230 by computing how much to change the driving parameters of the learning vehicle based on the trace parameters and adjusting those driving parameters. Trace parameters may be the location, orientation, relative position along the off-road trail, ride height, drive mode, brake regeneration level, steering angle, power consumption, acceleration, or torque. Driving parameters that may be adjusted are ride height, drive mode, and brake regeneration level. Method 200 may continue at step 250 by providing instructions for traversing the trace based on the trace parameters. Otherwise, if no adjustment is to be performed, then at step 240, method 200 may provide instructions for traversing the trace based on the trace parameters. Instructions may be in audio, visual, or haptic format.

In some embodiments, adjustment means that a driver may enable an automated driving system (ADS) and/or an advanced driver assistance system (ADAS). ADS and/or ADAS may use sensor measurements to configure the driving parameters of the learning vehicle to match the trace parameters of the precedent vehicle. Sensor measurements from the learning vehicle may be acceleration, torque, acceleration pedal angle, steering angle, brake pedal angles, roll, pitch, altitude, heading or location. Driving parameters that may be adjusted by ADS and/or ADAS may include steering angle, acceleration, or torque.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for providing learning mode instructions and adjusting driving parameters including the particular steps of the method of FIG. 2, this disclosure contemplates any suitable method for providing learning mode instructions and adjusting driving parameters including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
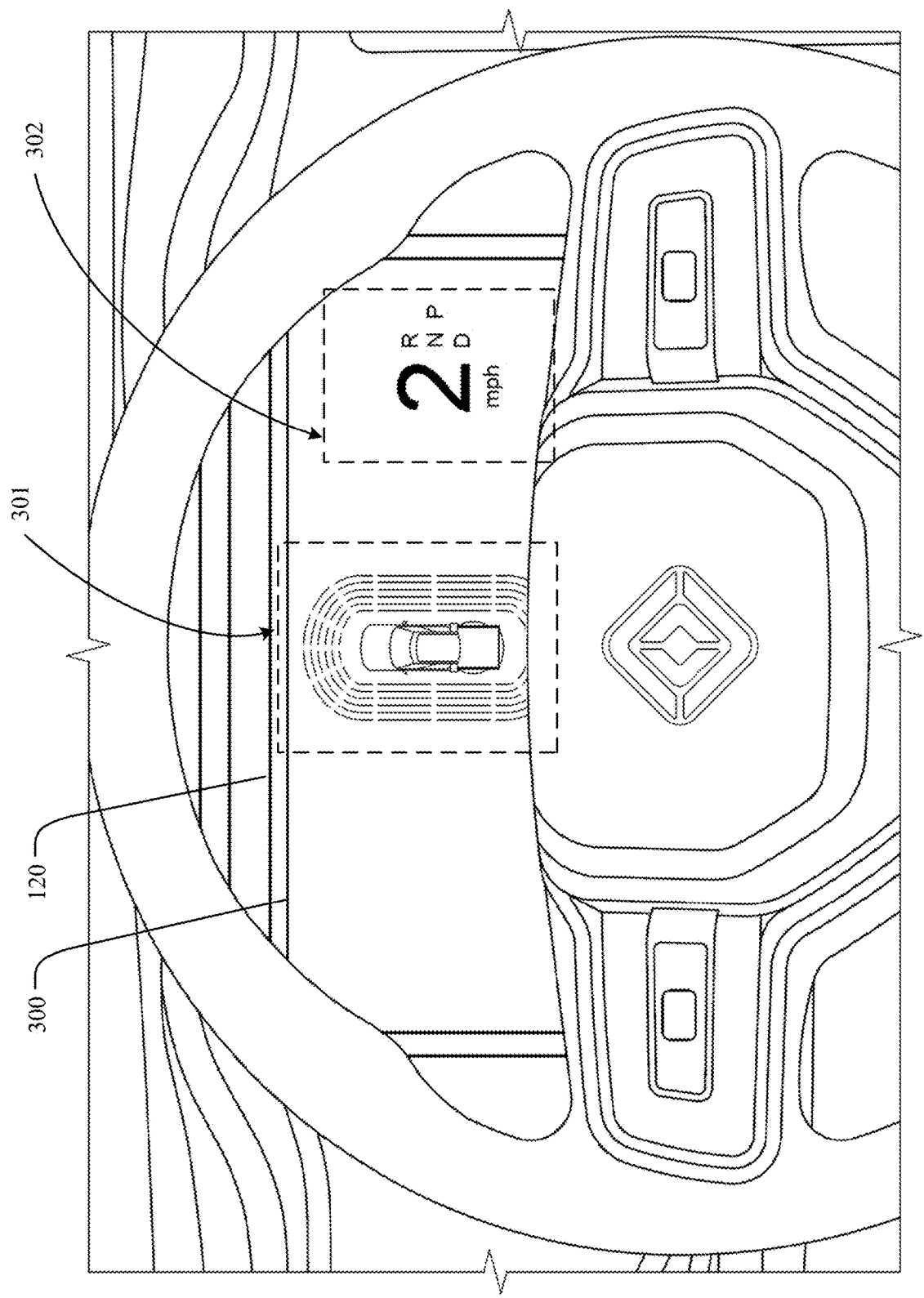
FIG. 3A illustrates the driver display GUI in a starting view.

FIG. 3A illustrates an example of the Driver Display Graphical User Interface (GUI) 300 in a starting view, displayed on driver display 120, which may be displayed while a driver of a learning vehicle selects an off-road trail for traversal. In some embodiments, the Driver Display GUI 300 in starting view may display a depiction of the vehicle and a sensory perimeter 301 around the vehicle. The Driver Display GUI 300 in starting view may display a depiction of the vehicle's current status 302, which may comprise the vehicle's drive mode and speed.

Figure 3B:
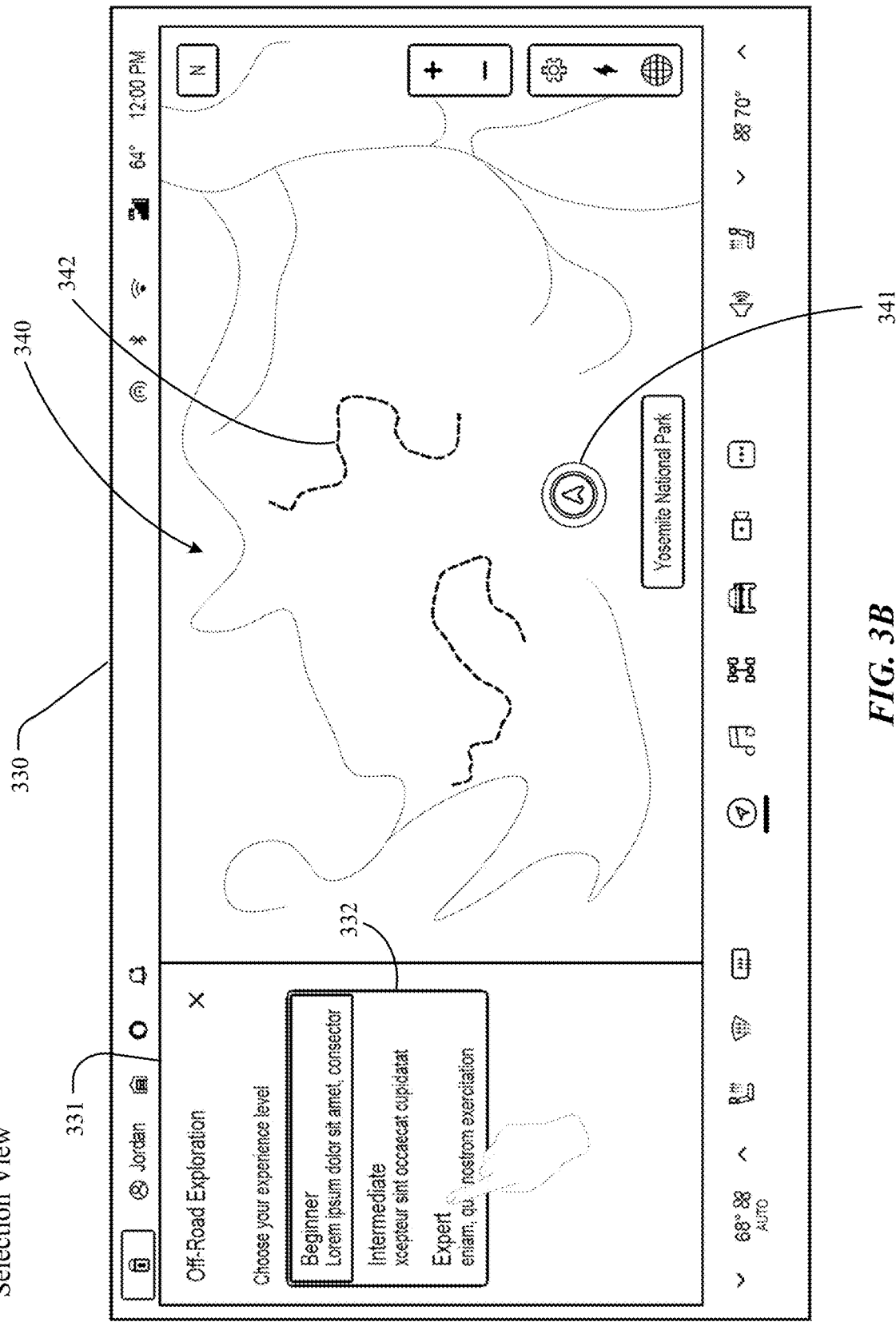
FIG. 3B illustrates the center display GUI in "Beginner" trail selection view.
Figure 3C:
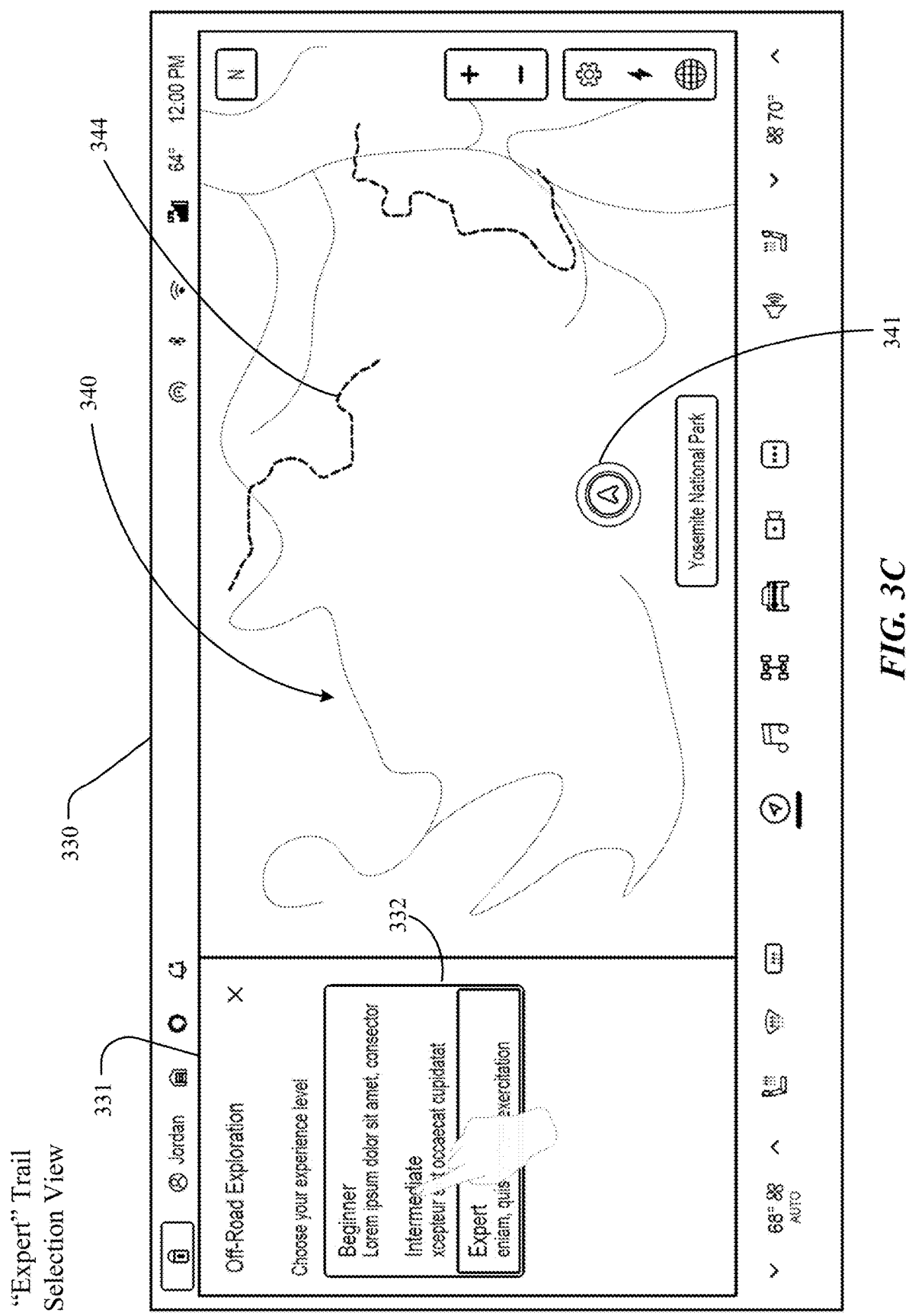
FIG. 3C illustrates the center display GUI in "Expert" trail selection view.
Figure 3D:
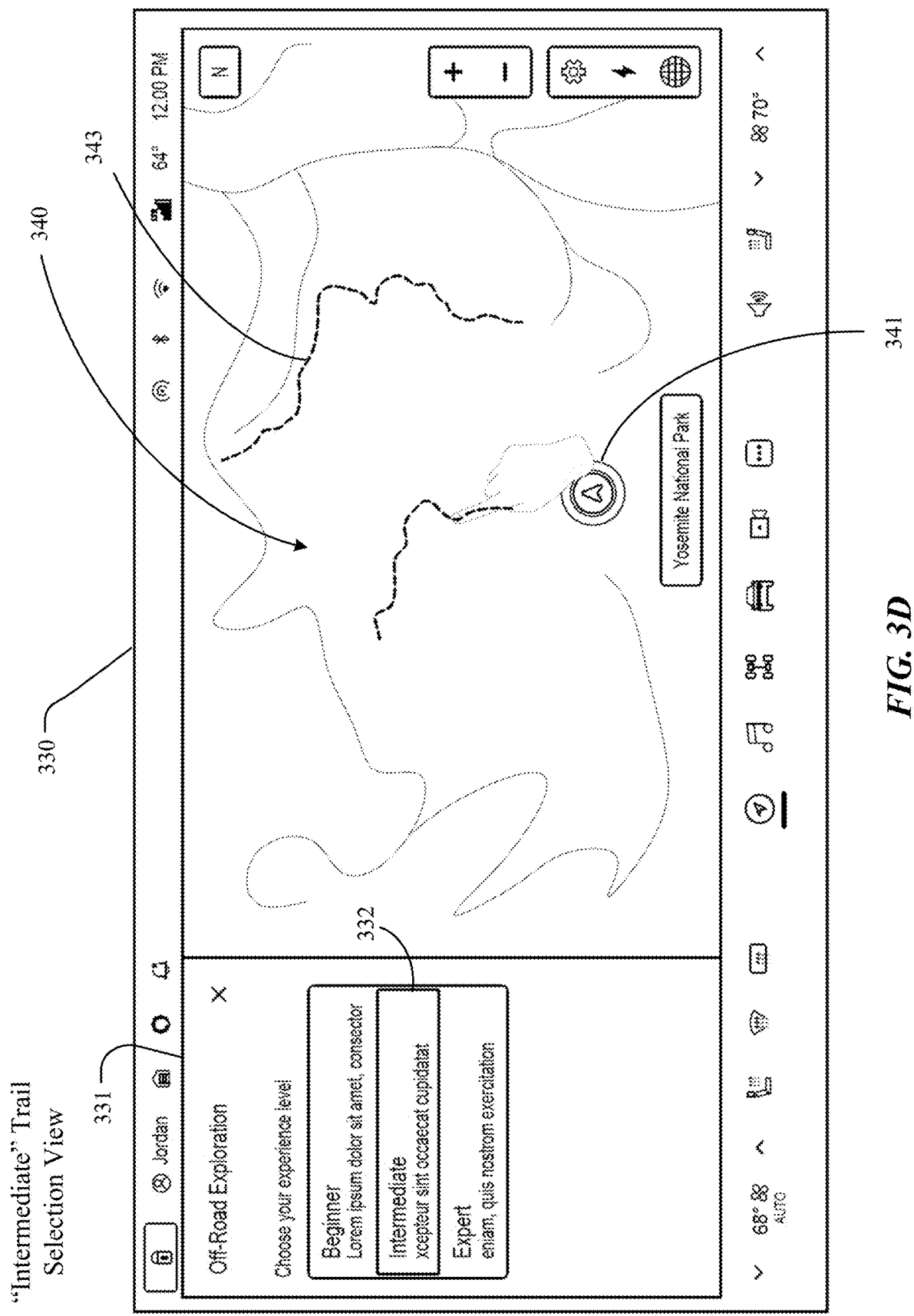
FIG. 3D illustrates the center display GUI in "Intermediate" trail selection view.

FIGS. 3B-3D illustrate examples of a route selection view in the Center Display GUI 330 displayed on center display 130, which may be displayed as the user of the learning vehicle selects an off-road trail for traversal. In some embodiments, the Center Display GUI 330 in route selection view includes a portion 331 (e.g., titled "Off-Road Exploration") that presents selectable options. The portion 331 that presents selectable options may include an experience level selection menu 332. The Center Display GUI 330 in route selection view may include a map 340. Map 340 may include a depiction of the learning vehicle's current position 341 overlaid on map 340. From the route selection view, the driver of the learning vehicle may select an option from experience level selection menu 332, causing the Center Display GUI 330 to display candidate trails for the selected experience level on map 340 for the user to select. As shown in FIG. 3B, the Center Display GUI 330 may display potential "Beginner" trails 342 overlaid on the map 340 for the user to select. A user may select an experience level of "Expert," causing the Center Display GUI 330 to display potential "Expert" trails 344 overlaid on the map 340 for the user to select, as shown in FIG. 3C. The user may then select an experience level of "Intermediate," causing the Center Display GUI 330 to display potential "Intermediate" trails 343 overlaid on the map 340 for the user to select, as shown in FIG. 3D. The experience level for a trail may be determined based on input provided by other drivers, input provided by expert drivers, or views captured by cameras on board precedent vehicles and later analyzed by humans or by machine-learning algorithms trained to classify trails.

Figure 3E:
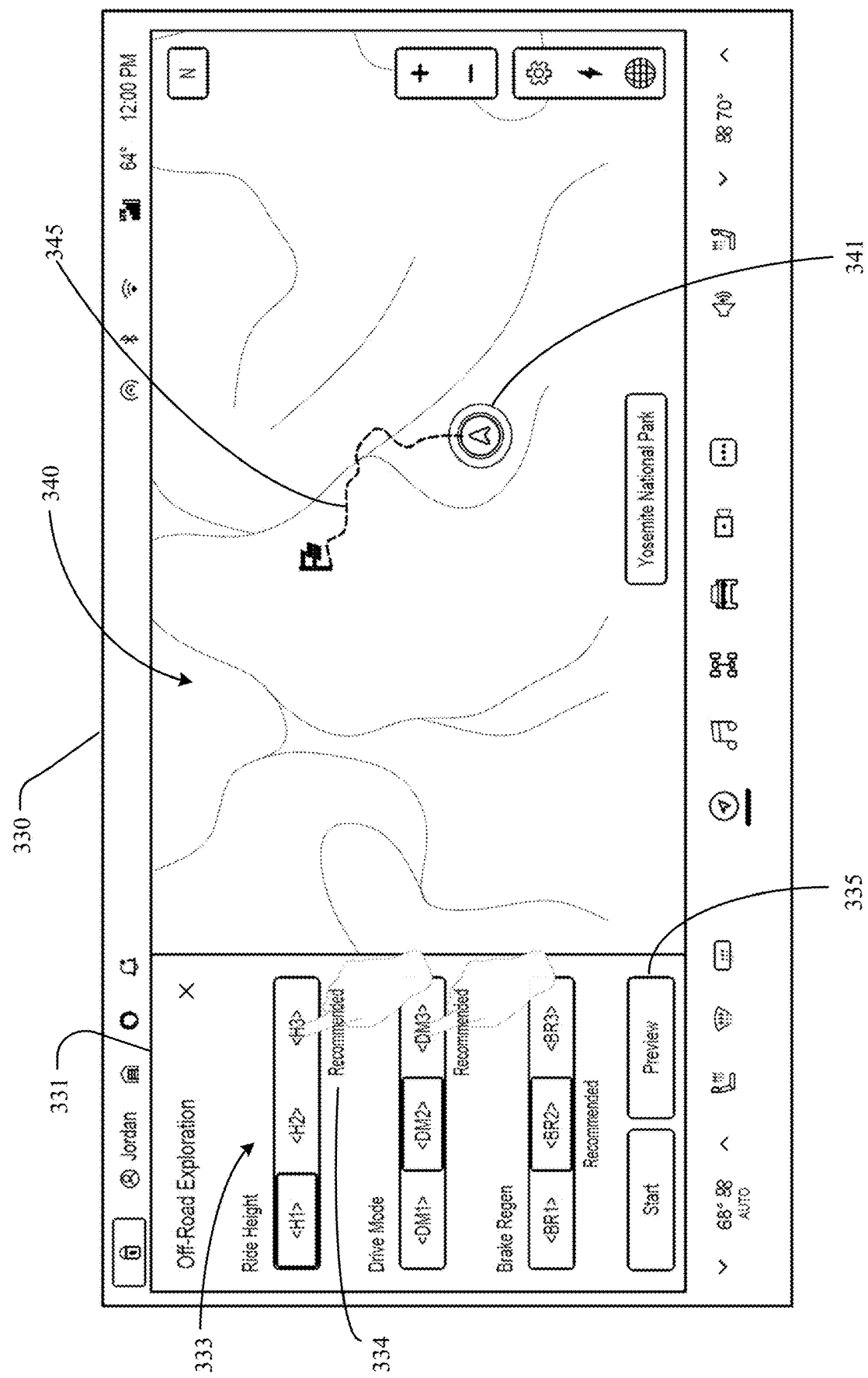
FIG. 3E illustrates the center display GUI in driving parameter selection view.

In some embodiments, once the driver of the learning vehicle selects an off-road trail, the trace of that off-road trail may be received by the learning vehicle. The trace of the off-road trail may be received all at once or received in stages as the learning vehicle traverses the trail. Once the driver selects an off-road trail, the Center Display GUI 330 may display turn-by-turn directions to the trailhead of the off-road trail on map 340. Once the learning vehicle reaches the trailhead, portion 331 that presents selectable options may display a driving parameter selection menu 333, shown in FIG. 3E. The driving parameter selection menu 333 may allow the driver of the learning vehicle to change driving parameters. Driving parameters on the driving parameter selection menu 333 may include ride height, drive mode, or brake regeneration. The driving parameter selection menu 333 may display a recommended setting 334 for each driving parameter.

Figure 4A:
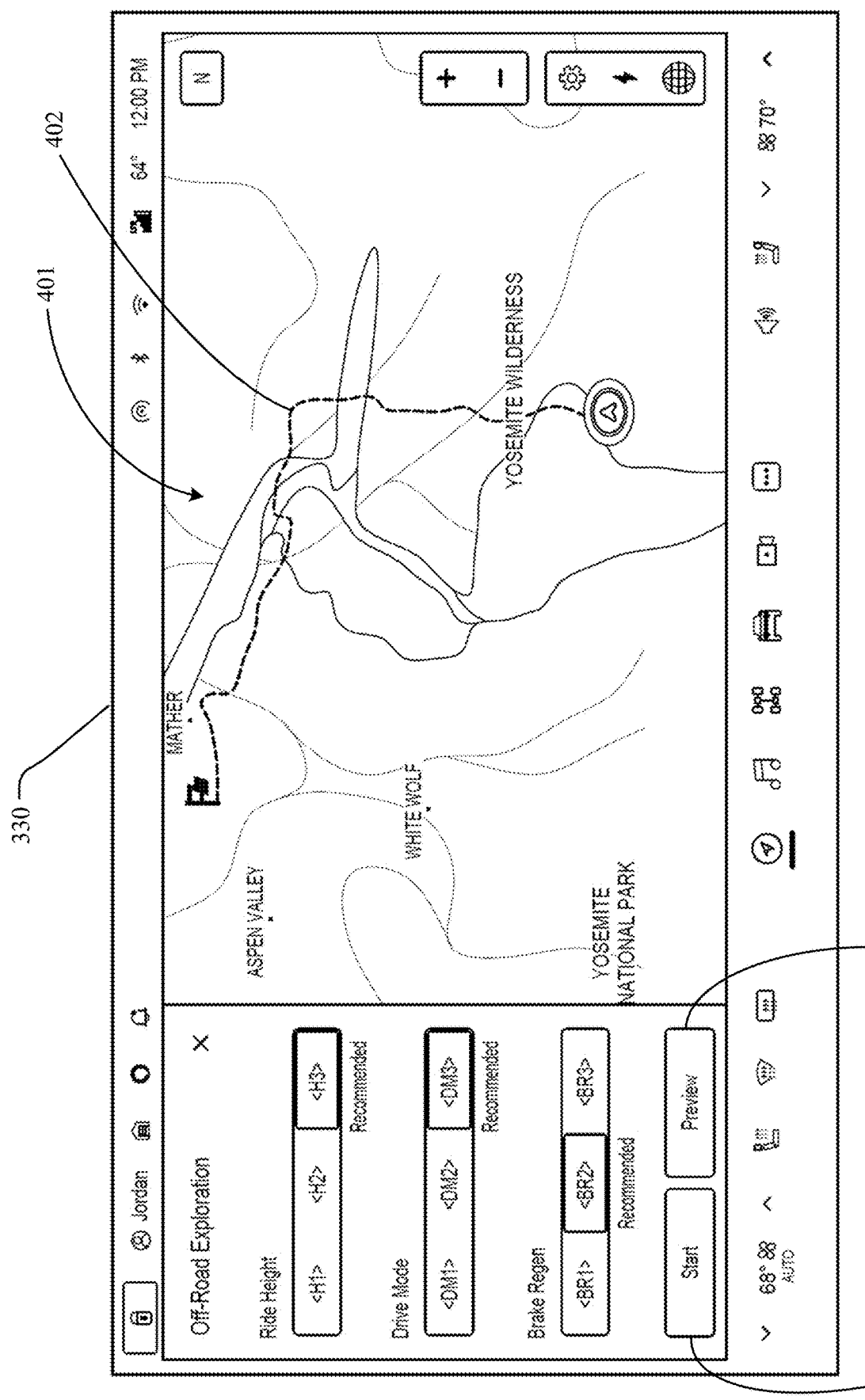
FIGS. 4A-4D illustrate the center display GUI in preview view.
Figure 4B:
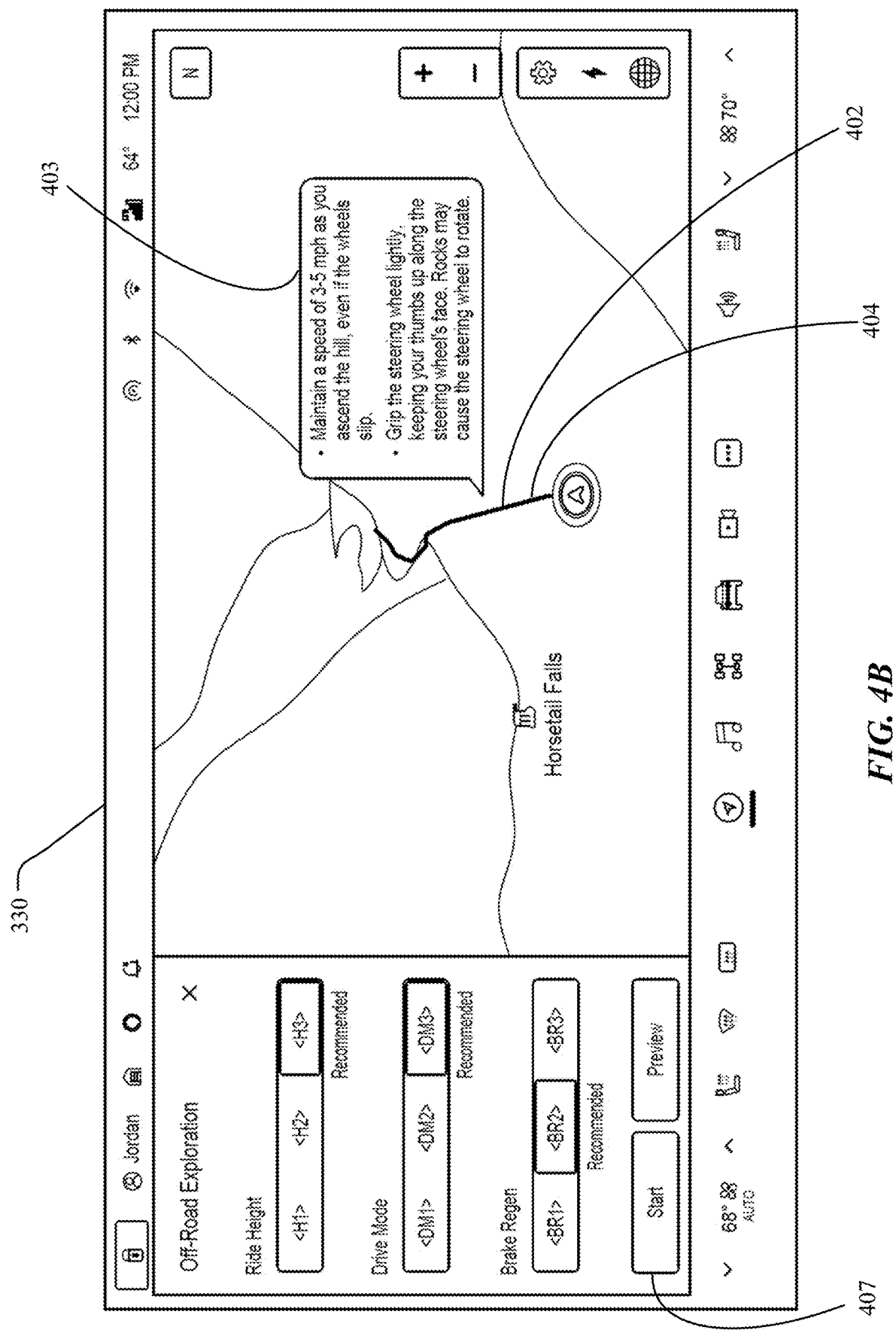
Figure 4C:
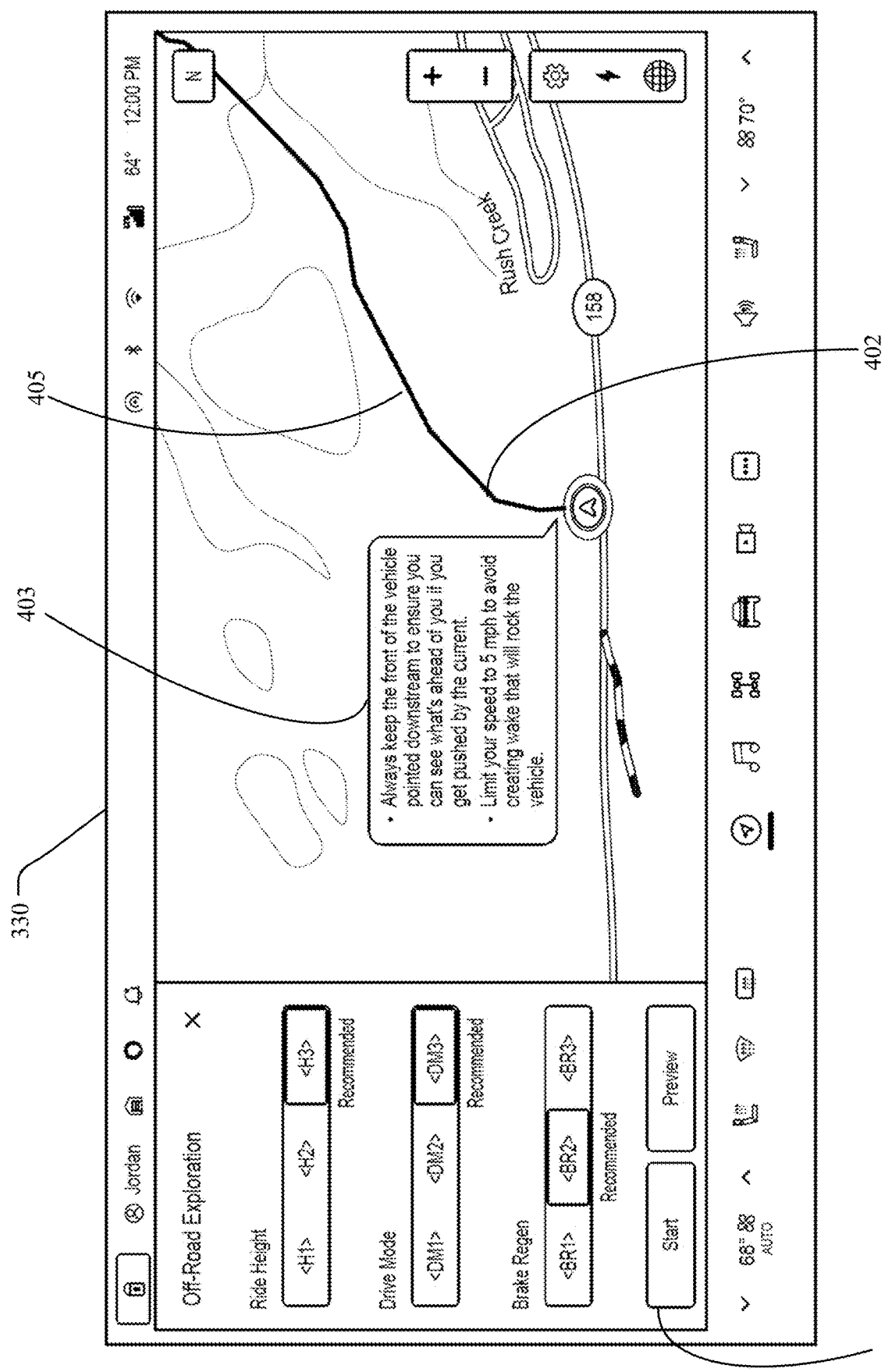
Figure 4D:
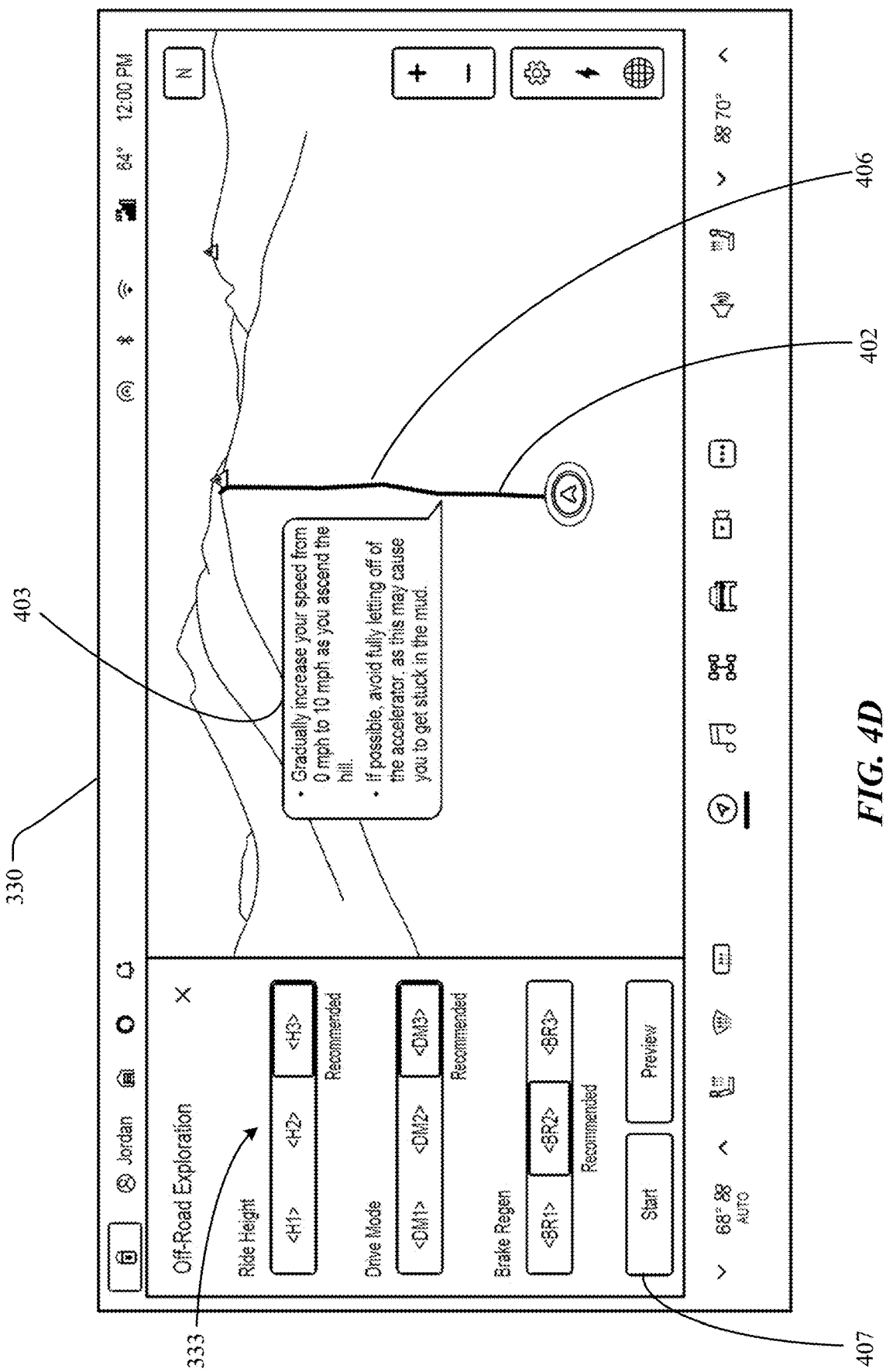

In some embodiments, the driving parameter selection menu 333 has a preview option button 335. The driver of the learning vehicle may select preview option button 335, which causes Center Display GUI 330 to display a preview view, shown in FIGS. 4A-4D. FIG. 4A illustrates a preview view GUI including a perspective map 401 with trace 402 (represented as a dashed line) of the selected off-road trail overlaid on perspective map 401. Center Display GUI 330 in preview view may zoom in on perspective map 401 to show segments of trace 402 and corresponding written instructions 403 for respective segments of trace 402. FIG. 4B illustrates an example of Center Display GUI 330 in preview view displaying a hill segment 404 of trace 402. FIG. 4C illustrates an example of Center Display GUI 330 in preview view displaying a creek segment 405 of trace 402. FIG. 4D illustrates an example of Center Display GUI 330 in preview view displaying a muddy hill segment 406 of trace 402. In some embodiments, the written instructions may have been provided by or be based upon information provided by the driver of the precedent vehicle when uploading the trace. In some embodiments, the written instructions may be generated based on sensor data collected from the precedent vehicle while traversing the trail. In some embodiments, the written instructions may be created by a human reviewer and then provided in association with the uploaded trace.

In some embodiments, the driving parameter selection menu 333 has a start option button 407. The driver of the learning vehicle may select the start option button 407. Selecting the start option button 407 may cause the Driver Display GUI 300 to enter learning view. Selecting the start option button 407 may cause the Center Display GUI 330 to enter learning view.

In some embodiments, the Driver Display GUI 300 in learning view provides visual instructions comprising a video of the off-road trail with the trace 501 overlaid on the video for the learning vehicle to follow during traversal of the off-road trail. The video may be a real-time display of the learning vehicle's surroundings or a recording taken by the precedent vehicle. The Center Display GUI 330 in learning view may display map 340, with the learning vehicle's current position 341 and trace 402 of the off-road trail overlaid on the map. The Center Display GUI 330 in learning view may provide written instructions 502 for traversing the off-road trail in portion 503. The heads-up display 141 may display a projection of the precedent vehicle traversing the trail for the driver of the learning vehicle to follow. Speakers in the learning vehicle may play audio instructions for traversing the off-road trail. The written instructions 502 may be the same as the audio instructions or they may be different. Haptic feedback actuators may be built into various components. Haptic feedback actuators may be built into the steering wheel, acceleration pedal, or brake pedal. Haptic feedback actuators may provide feedback to instruct the learning vehicle as it traverses the off-road trail.

Figure 5A:
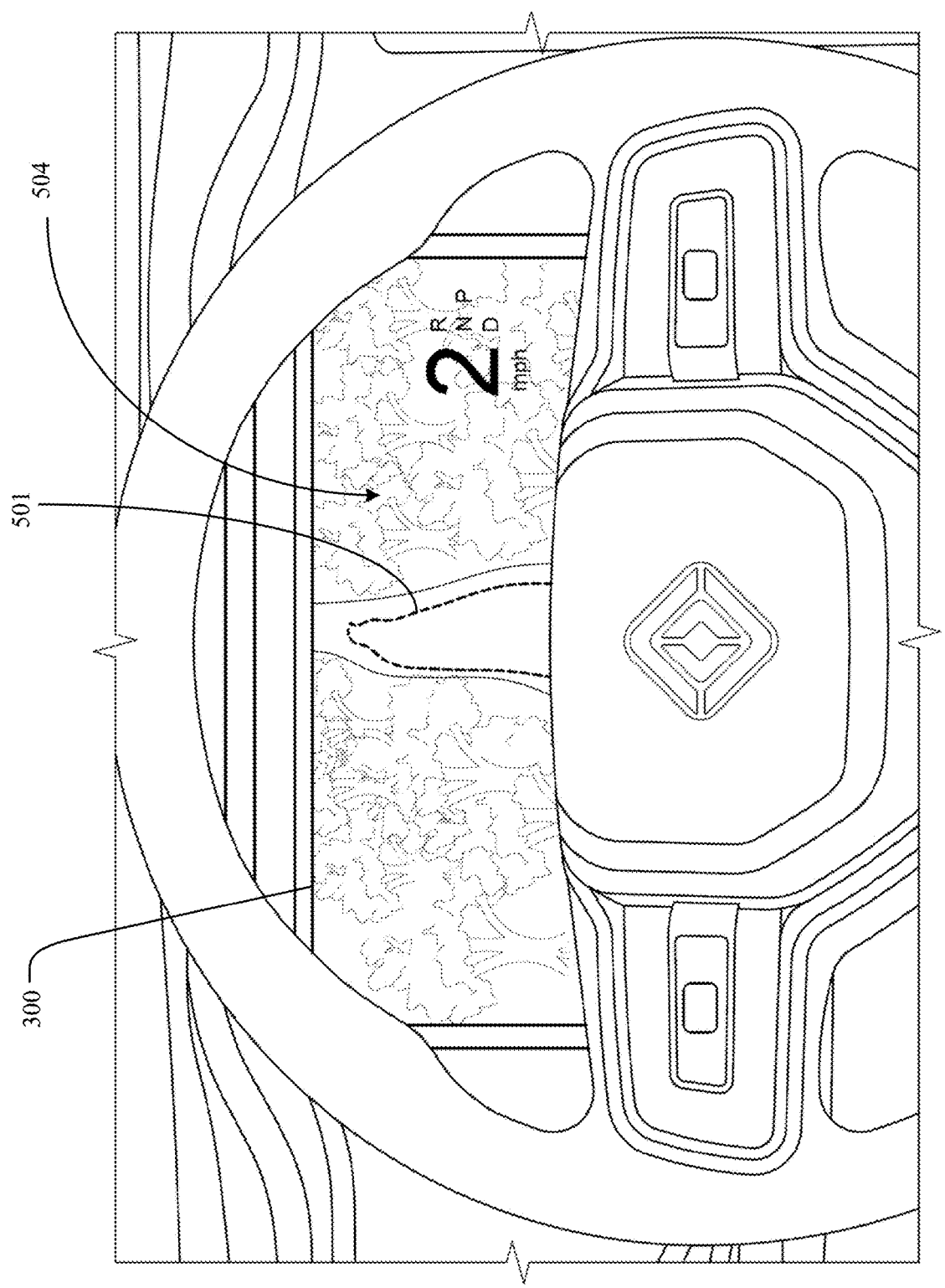
FIGS. 5A-5B illustrate the driver display and the center display learning GUIs, respectively, as the learning vehicle ascends a hill while traversing a trace.
Figure 5B:
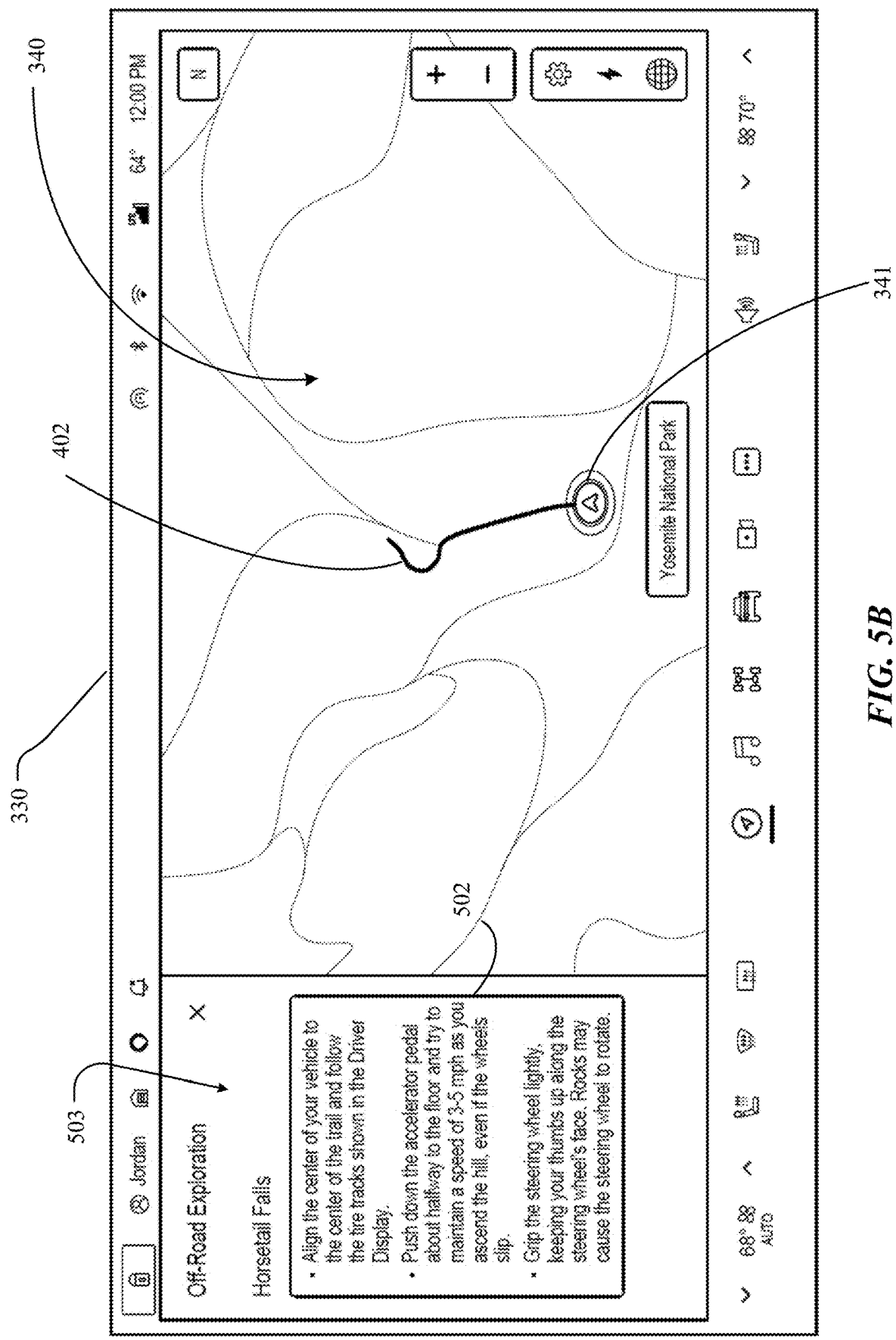

FIGS. 5A-5H illustrate examples of the Driver Display GUI 300 in learning view and of the Center Display GUI 330 in learning view as the learning vehicle traverses the off-road trail. FIGS. 5A-5B illustrate examples of the Driver Display GUI 300 in learning view and of the Center Display GUI 330 in learning view as the learning vehicle climbs a hill during traversal of the off-road trail. FIG. 5A illustrates Driver Display GUI 300 in learning view providing visual instructions comprising of a video of the hill portion 504 of the off-road trail with the trace 501 overlaid on video 504. FIG. 5B illustrates Center Display GUI 330 in learning view providing instructions 502 as the vehicle climbs a hill during traversal of the off-road trail and trace 402 overlaid on map 340.

Figure 5C:
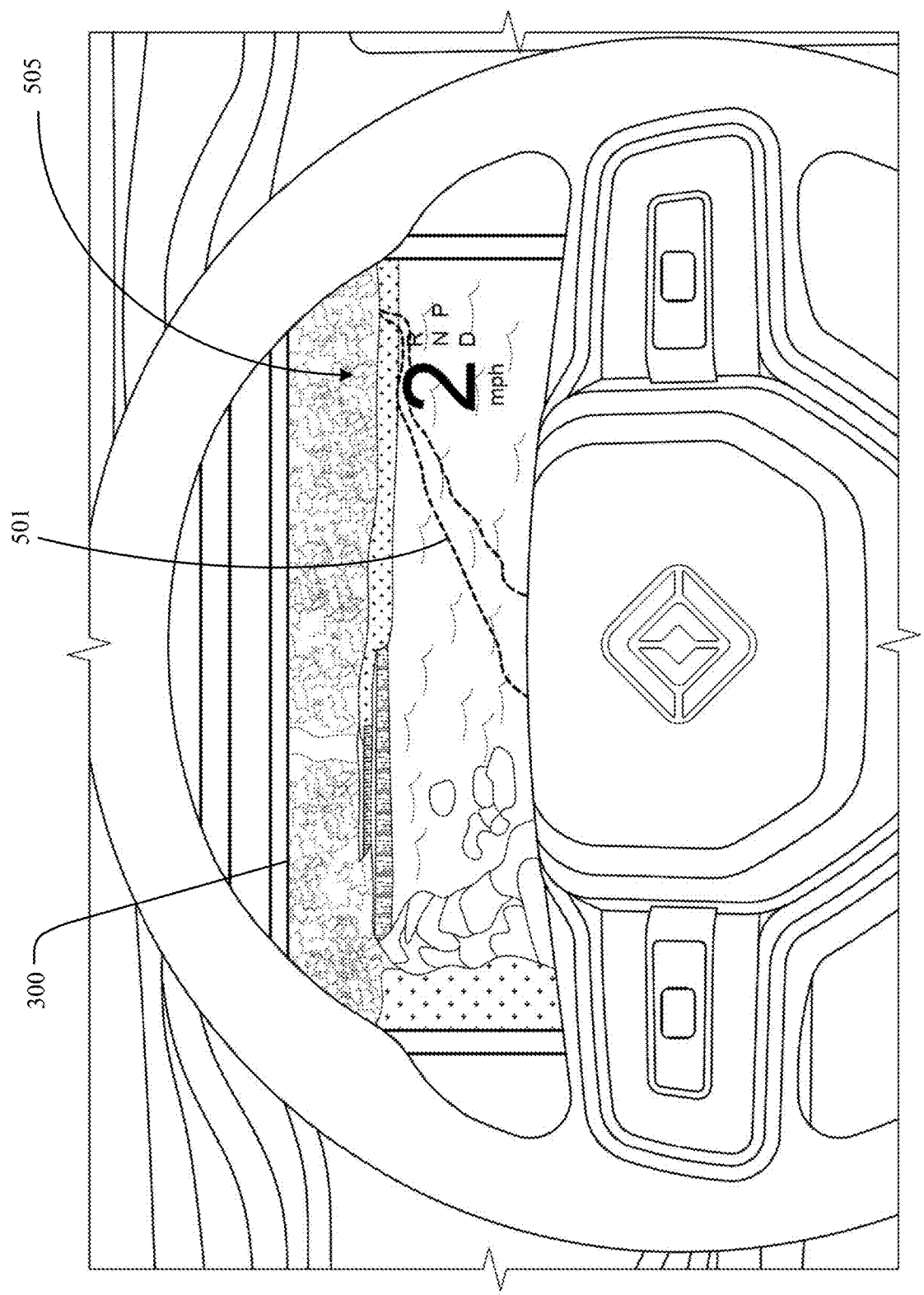
FIGS. 5C-5D illustrate the driver display and the center display learning GUIs, respectively, as the learning vehicle crosses a stream while traversing a trace.
Figure 5D:
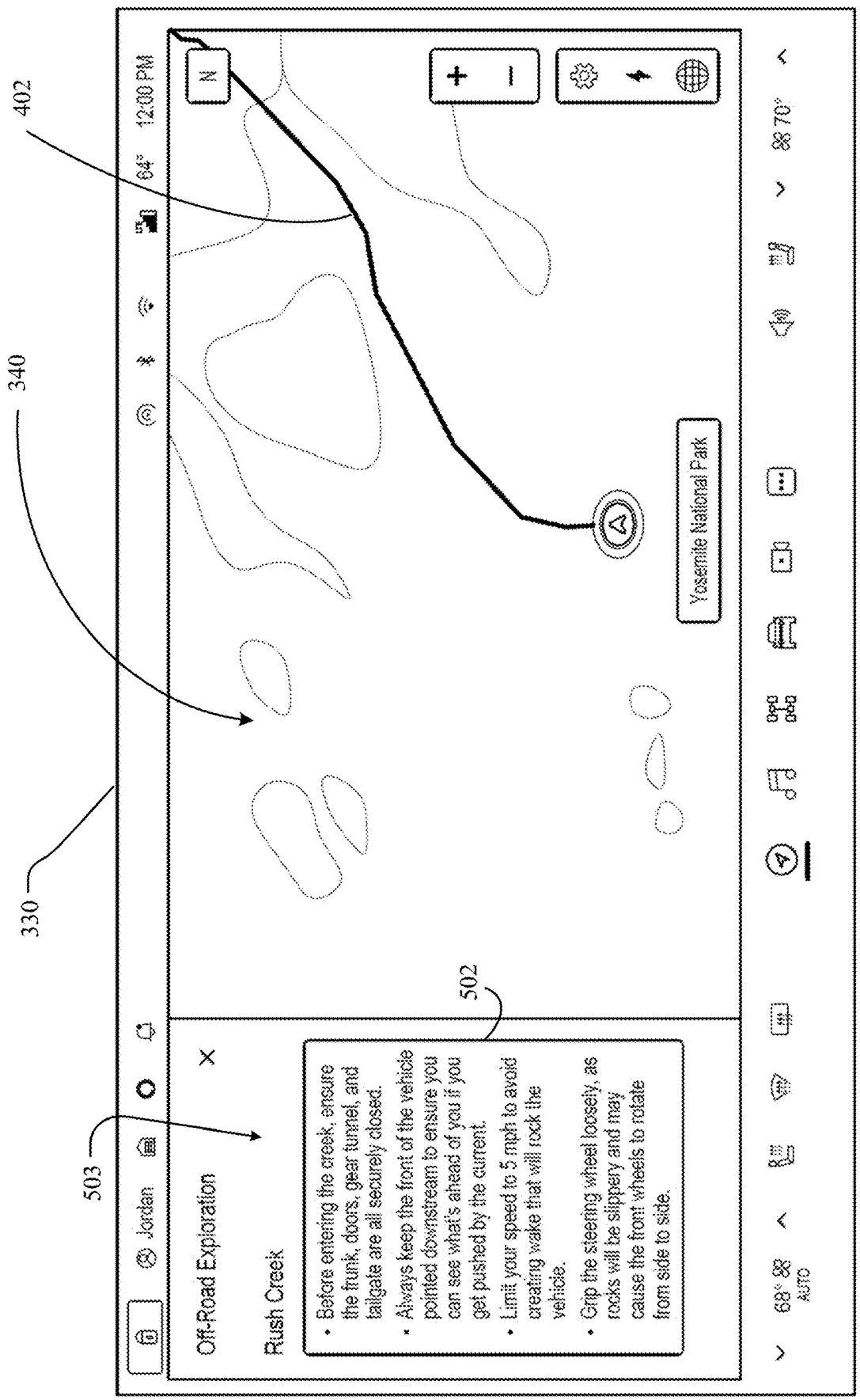

FIGS. 5C-5D illustrate examples of the Driver Display GUI 300 in learning view and of the Center Display GUI 330 in learning view as the learning vehicle crosses a creek during traversal of the off-road trail. FIG. 5C illustrates Driver Display GUI 300 in learning view providing visual instructions comprising of a video 505 of the creek portion of the off-road trail with the trace 501 overlaid on video 505. FIG. 5D illustrates Center Display GUI 330 in learning view providing instructions 502 as the vehicle crosses a creek during traversal of the off-road trail and trace 402 overlaid on map 340.

Figure 5E:
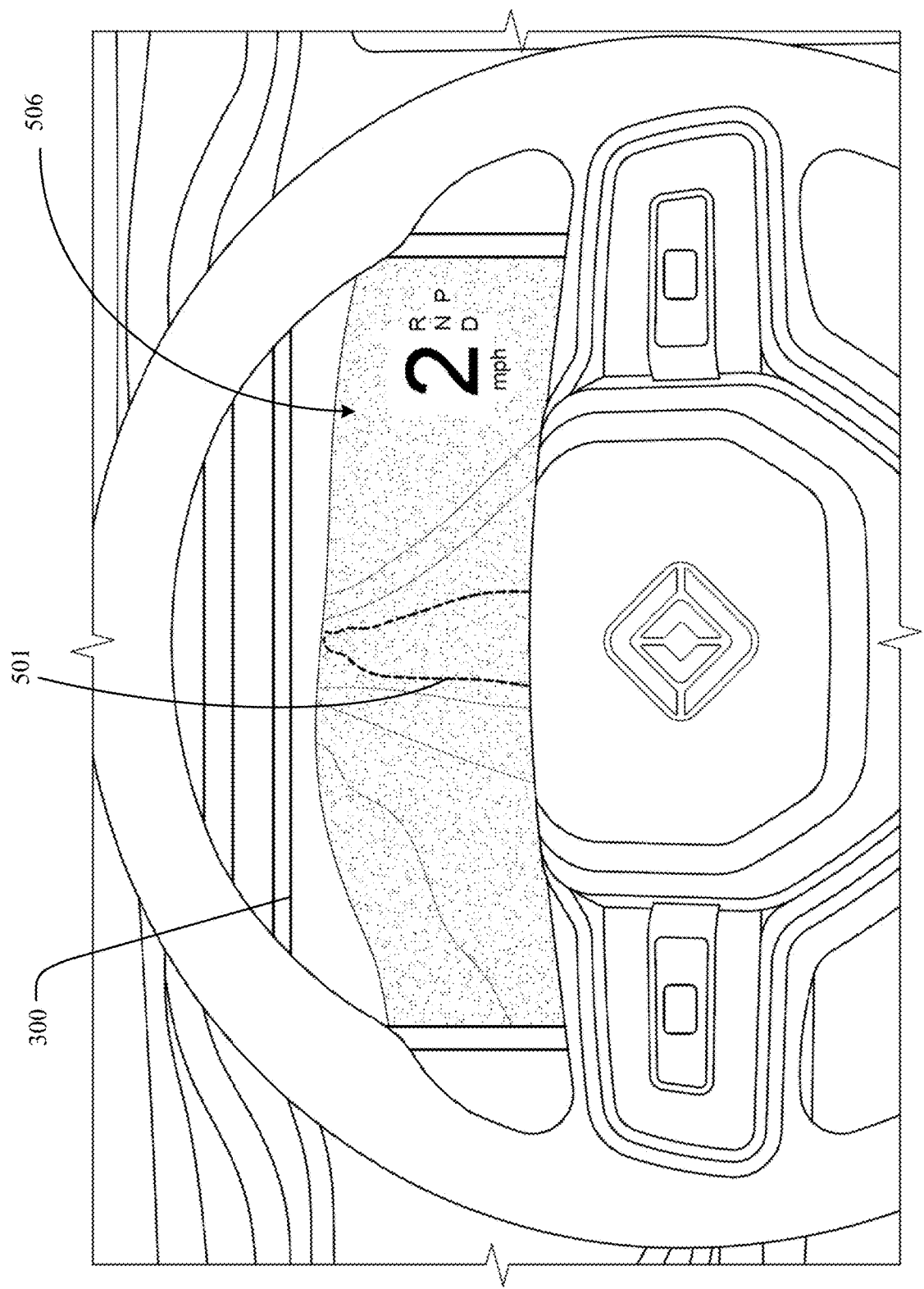
FIGS. 5E-5F illustrate the driver display and the center display learning GUIs, respectively, as the learning vehicle ascends a muddy hill while traversing a trace.
Figure 5F:
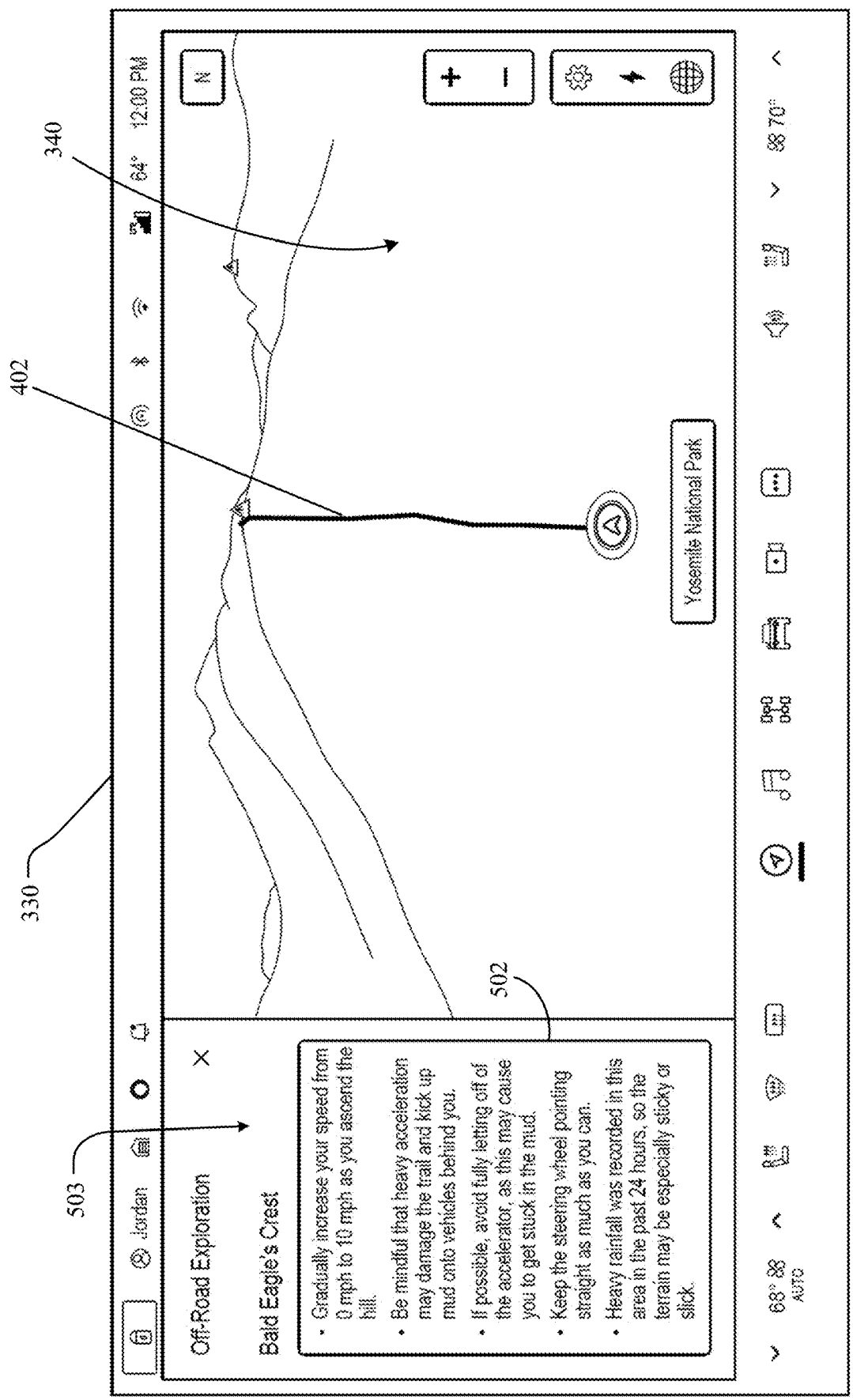

FIGS. 5E-5F illustrate examples of the Driver Display GUI 300 in learning view and of the Center Display GUI 330 in learning view as the learning vehicle climbs a muddy hill during traversal of the off-road trail. FIG. 5E illustrates Driver Display GUI 300 in learning view providing visual instructions comprising of a video 506 of the muddy hill portion of the off-road trail with the trace 501 overlaid on video 506. FIG. 5F illustrates Center Display GUI 330 in learning view providing instructions 502 as the vehicle climbs a muddy hill during traversal of the off-road trail and trace 402 overlaid on map 340.

Figure 5G:
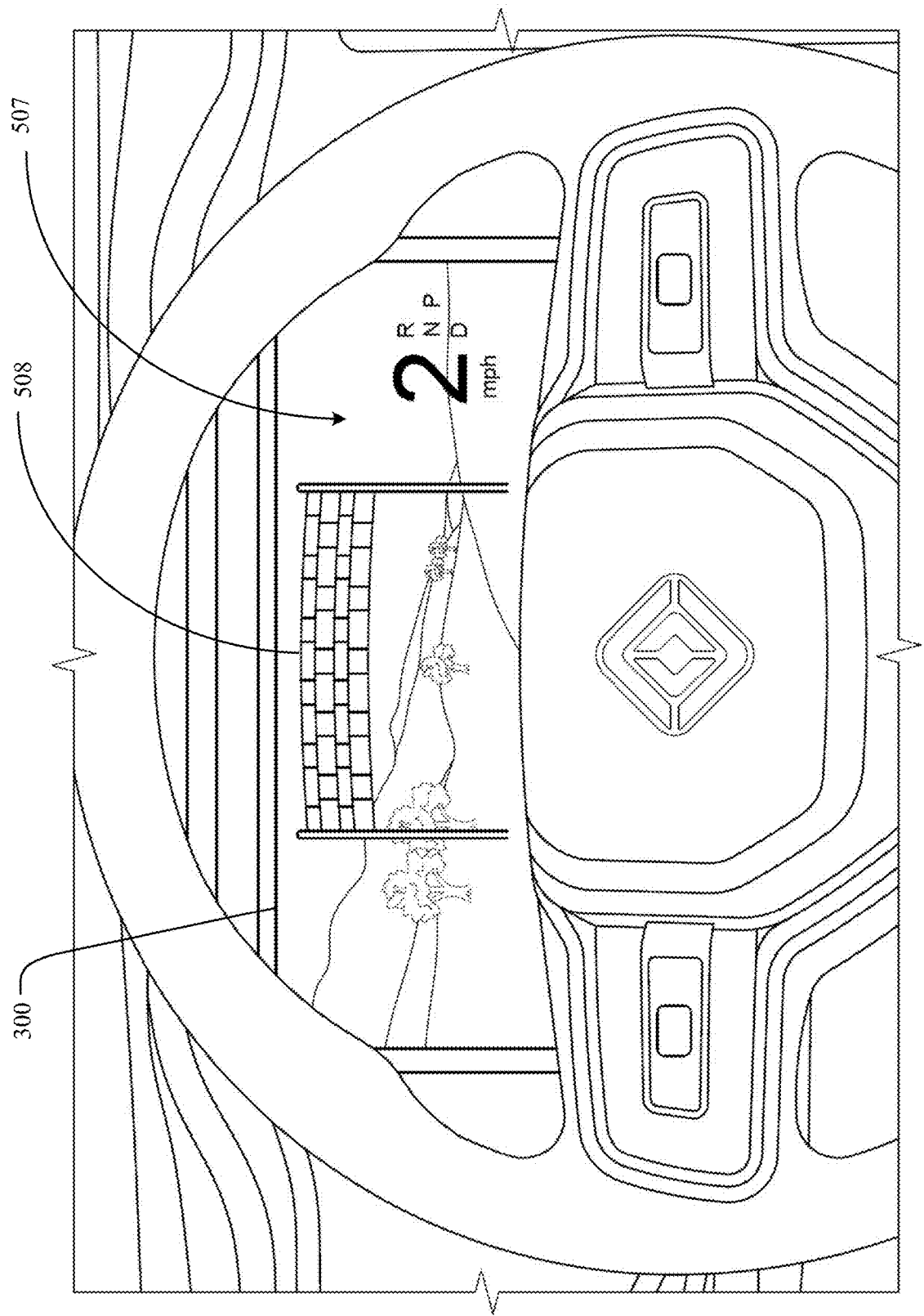
FIGS. 5G-5H illustrate the driver display and the center display learning GUIs, respectively, as the learning vehicle completes traversing a trace.
Figure 5H:
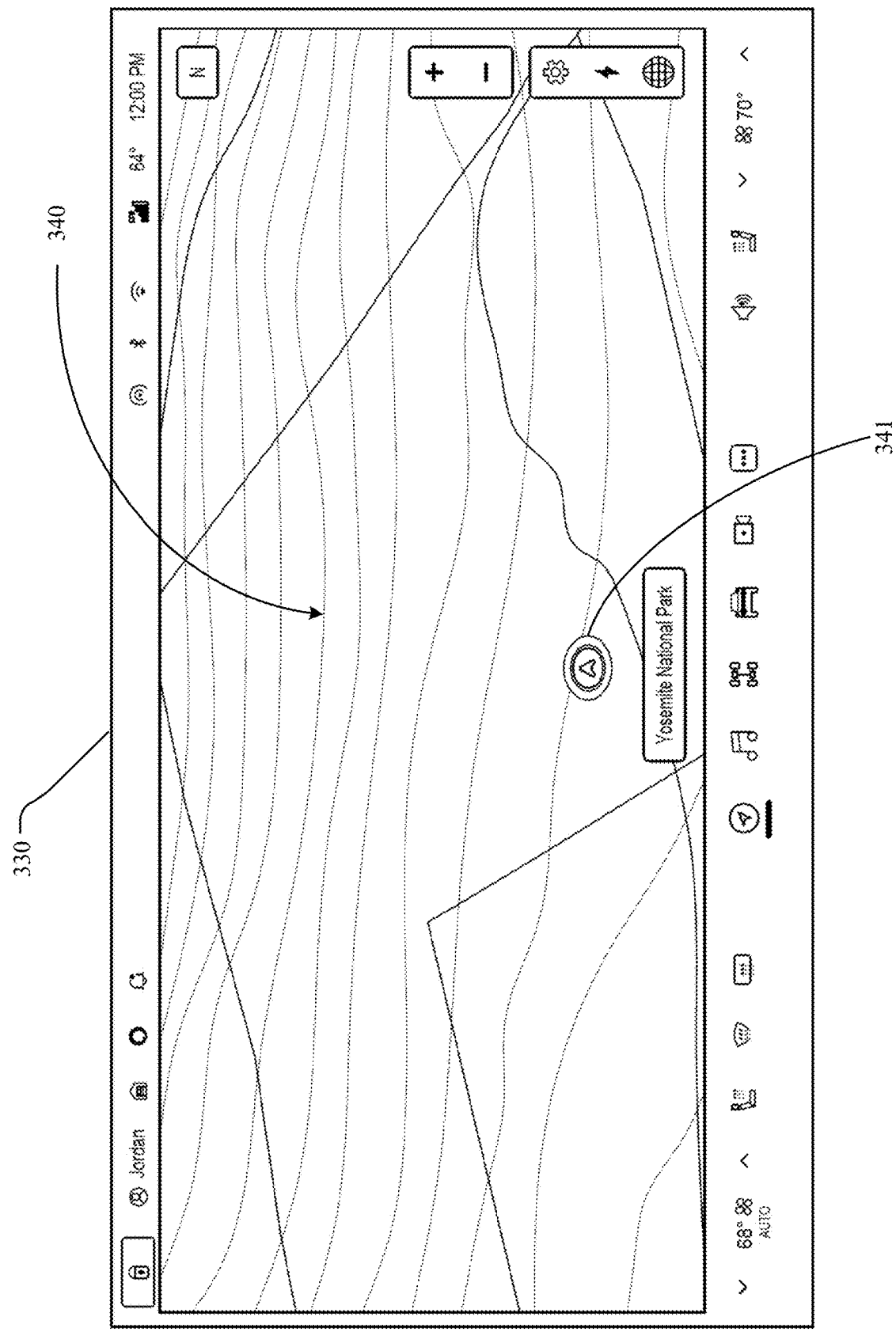

FIGS. 5G-5H illustrate examples of the Driver Display GUI 300 in learning view and of the Center Display GUI 330 as the learning vehicle completes traversing the off-road trail. FIG. 5G illustrates Driver Display GUI 300 in learning view providing visual instructions comprising of a video 507 of the end of the off-road trail with a completion banner 508 overlaid on video 507. FIG. 5H illustrates Center Display GUI after the vehicle completes traversing the off-road trail.

Figure 7:
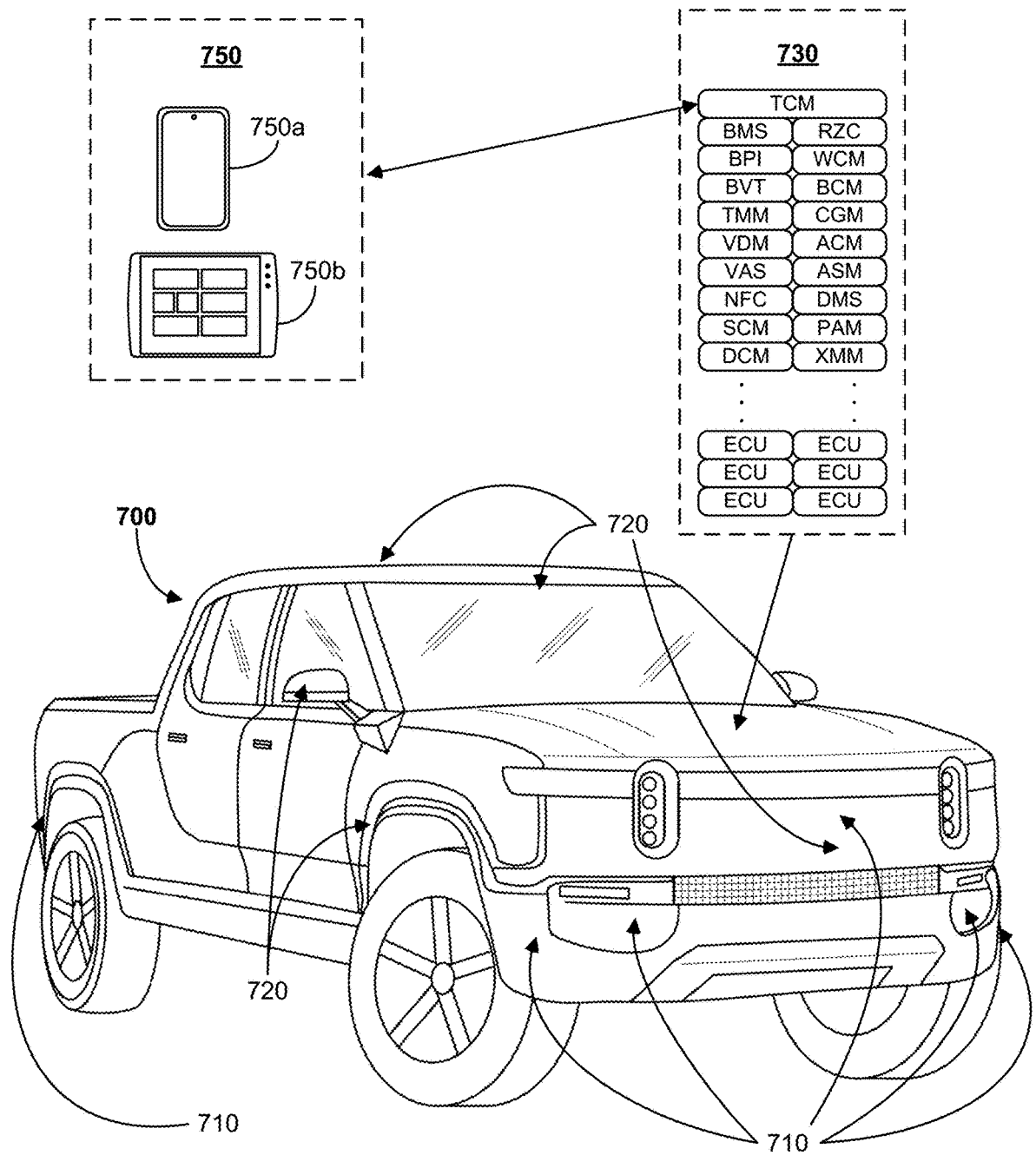
FIG. 7 illustrates an example vehicle 700 and the various computing units used to operate the vehicle.

FIG. 6 is a diagram illustrating exchanges between a precedent vehicle and a learning vehicle through an online portal. The control system of a precedent vehicle, while completing a traversal of the off-road trail or upon completion of the off-road trail, will upload the trace to an online portal. The trace data may then be stored in a database of the online portal. The online portal may also store other information in conjunction with the trace data, such as metadata associated with the vehicle type, vehicle condition, vehicle modifications and/or upgrades, location, date, time, weather information, terrain information, driver experience level, driver off-roading history, power consumption data, vehicle load, or other types of relevant metadata. The metadata may be obtained from the vehicle, from a third-party server, or from other traces and associated metadata stored on the online portal. When a learning vehicle reaches the off-road trail, it sends a request for the trace. The request may specify certain types of information for the learning vehicle, including the following non-limiting examples: a vehicle type, driver off-roading history, vehicle load, vehicle condition, vehicle modifications and/or upgrades, battery status, or any other relevant information. In identifying a suitable trace for the learning vehicle from all traces stored in the online portal, in addition to considering information provided with the request, the online portal may also utilize other information to filter out less suitable options and/or to create a list of the best options for the learning vehicle, including the following non-limiting examples: location, date, time, weather information, terrain information, historical information regarding the trace as driven by other learning vehicles. Once one or more stored traces responsive to the request are identified by the online portal, the one or more traces may then be downloaded prior to commencing traversal of the trail or streamed to the learning vehicle as it traverses the trail. The control system then may adjust the driving parameters of the learning vehicle based on the trace parameters. The control system may also provide instructions for traversing the trace based on the trace parameters. When traversal is complete, the learning vehicle may then upload their own trace with annotations that may be audio, text, and/or visual comments. The communication between the vehicles and the online portal may be supported through communication interface 910 that may be a network interface controller (NIC) or network adapter for communicating with an Ethernet or other wire-based network or a wireless NIC (WNIC) or wireless adapter for communicating with a wireless networks, such as WI-FI network or a cellular network FIG. 7 illustrates an example vehicle 700. Vehicle 700 may include multiple sensors 710, multiple cameras 720, and a control system 730. In some embodiments, vehicle 700 may be able to pair with a computing device 750 (e.g., smartphone 750*a*, tablet computing device 750*b*, or a smart vehicle accessory). As an example and not by way of limitation, a sensor 710 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 720 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 700 may include various controllable components (e.g., doors, seats, windows, lights, HVAC, entertainment system, security system), instrument and information displays and/or interactive interfaces, functionality to pair a computing device 750 with the vehicle (which may enable control of certain vehicle functions using the computing device 750), and functionality to pair accessories with the vehicle, which may then be controllable through an interactive interface in the vehicle or through a paired computing device 750.

Control system 730 may enable control of various systems on-board the vehicle. As shown in FIG. 7, control system 730 may comprise one or more electronic control units (ECUs), each of which are dedicated to a specific set of functions. Each ECU may be a computer system (as described further in FIG. 9), and each ECU may include functionality provided by one or more of the example ECUs described below.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 750, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by one or more ECUs that may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 720 and/or sensors 710. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 720 and/or sensors 710 in order to determine appropriate control commands.

Features of embodiments as described herein may be controlled by an Experience Management Module (XMM) ECU that may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 730. In some embodiments, functions of the ACM and the XMM may be combined together into an Autonomous eXperience Module (AXM) ECU.

Vehicle 700 may include one or more additional ECUs, such as, by way of example and not limitation: a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, a Driver Monitoring System (DMS) ECU, and/or a Winch Control Module (WCM) ECU. If vehicle 700 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 8:
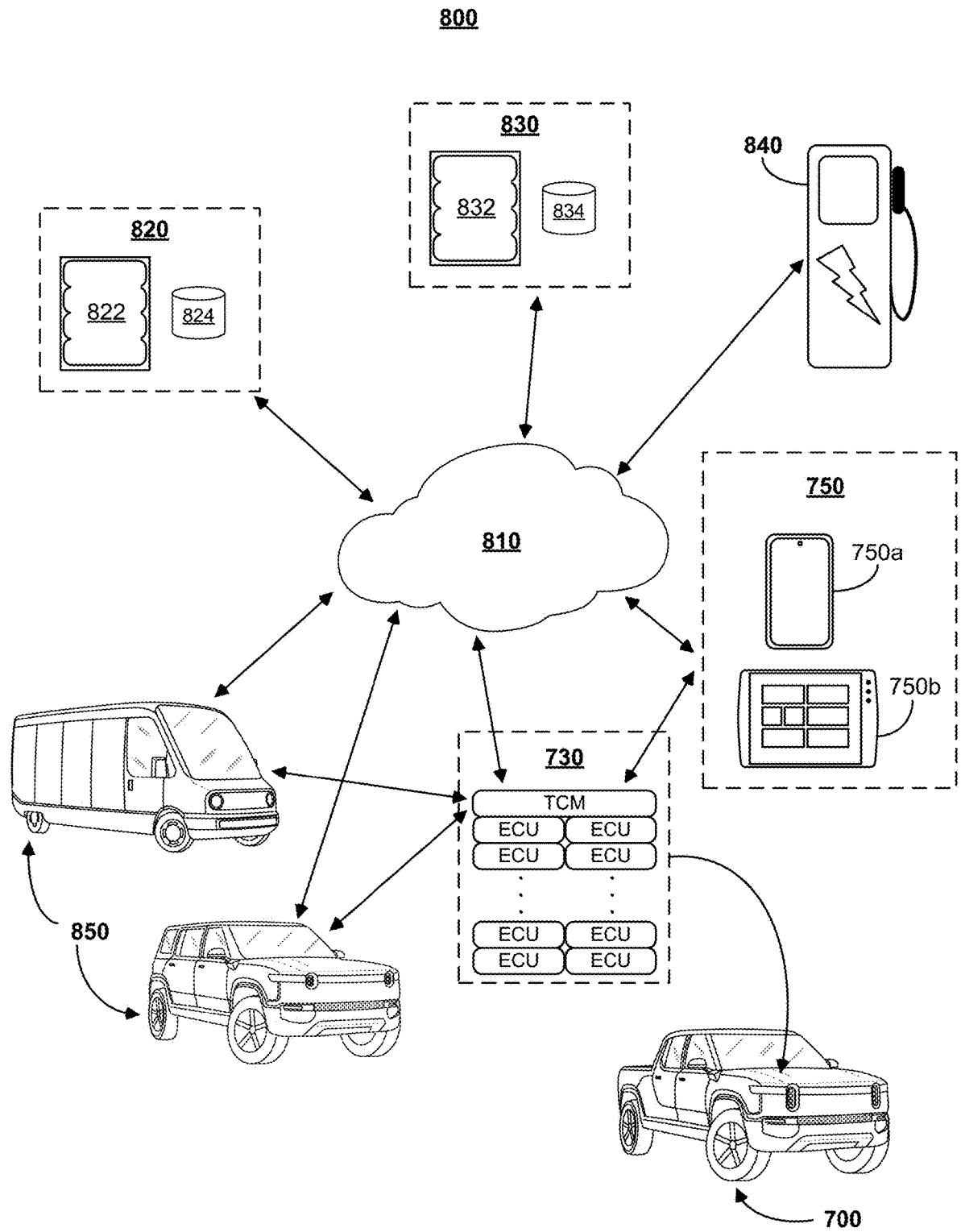
FIG. 8 illustrates an example networked environment 800 between an example vehicle and various smart devices and environments.

FIG. 8 illustrates an example networked environment 800. Computer system 800 may include a connected vehicle 700 with a control system 730 that is capable of transmitting data to/from a network 810. Network 810 may also be connected to one or more computing servers 820 (e.g., including compute units 822 and storage units 824) associated with a vehicle manufacturer, a vehicle service provider, a vehicle fleet operator, or a vehicle-charging facility provider. Network 810 may also be connected to one or more third-party computing servers 830 (e.g., including compute units 832 and storage units 834) associated with, for example, a smart accessory manufacturer, a group event organizer, service provider, or a governmental organization. Networked environment 800 may include one or more landscape features 840 (e.g., automated toll road sensors, smart road signs or road markers, automated toll gates, power dispensers at charging stations). Networked environment 800 may also include other connected vehicles 850 that may be capable of communicating with vehicle 700 through network 810 and/or directly with vehicle 700 (e.g., by communicating with a TCM ECU of a control system 730 of vehicle 700 when connected vehicle 850 is within range of a short-range communications network, such as Bluetooth). Networked environment 800 may also include one or more computing devices 750 (e.g., smartphone 750a, a tablet computing device 750b, or a smart vehicle accessory) capable of communicating with network 810 and/or directly with vehicle 700.

Networked environment 800 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 700 to deduct a toll from a specified account and provides confirmation of the transaction). In particular embodiments, one or more elements of networked environment 800 may include one or more computer systems, as described in further detail with respect to FIG. 9A. In particular embodiments, one or more elements of networked environment 800 perform one or more steps of one or more methods described or illustrated herein. In particular embodiments, software running on one or more elements of networked environment 800 may be controlled by a single entity to perform one or more steps of one or more methods described or illustrated herein or provide functionality described or illustrated herein.

FIG. 9A illustrates an example computer system 900. Computer system 900 may include a processor 902, memory 904, storage 906, an input/output (I/O) interface 908, a communication interface 910, and a bus 912. Although this disclosure describes one example computer system including specified components in a particular arrangement, this disclosure contemplates any suitable computer system with any suitable number of any suitable components in any suitable arrangement. As an example and not by way of limitation, computer system 900 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 900 may include one or more computer systems 900; be unitary or distributed, span multiple locations, machines, or data centers; or reside in a cloud, which may include one or more cloud components in one or more networks. Where appropriate, computer system(s) 900 may perform, at different times or at different locations, in real time or in batch mode, one or more steps of one or more methods described or illustrated herein.

Processor 902 (e.g., compute units 822 and 832) may include hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906 (e.g., storage units 824 and 834). Processor 902 may include one or more internal caches for data, instructions, or addresses.

In particular embodiments, memory 904 includes main memory for storing instructions for processor 902 to execute or data for processor 902 to operate on. In particular embodiments, one or more memory management units (MMUs) reside between processor 902 and memory 904 and facilitate accesses to memory 904 requested by processor 902. In particular embodiments, memory 904 includes random access memory (RAM). This disclosure contemplates any suitable RAM.

In particular embodiments, storage 906 includes mass storage for data or instructions. As an example and not by way of limitation, storage 906 may include a removable disk drive, flash memory, an optical disc, a magneto-optical disc, magnetic tape, or a Universal Serial Bus (USB) drive or two or more of these. Storage 906 may include removable or fixed media and may be internal or external to computer system 900. Storage 906 may include any suitable form of non-volatile, solid-state memory or read-only memory (ROM).

In particular embodiments, I/O interface 908 includes hardware, software, or both, providing one or more interfaces for communication between computer system 900 and one or more input and/or output (I/O) devices. Computer system 900 may be communicably connected to one or more of these I/O devices, which may be incorporated into, plugged into, paired with, or otherwise communicably connected to vehicle 700 (e.g., through the TCM ECU). An input device may include any suitable device for converting volitional user input into digital signals that can be processed by computer system 900, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 710 described above. An output device may include devices designed to receive digital signals from computer system 900 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 908 for them. I/O interface 908 may include one or more I/O interfaces 908, where appropriate.

In particular embodiments, communication interface 910 includes hardware, software, or both providing one or more interfaces for data communication between computer system 900 and one or more other computer systems 900 or one or more networks. Communication interface 910 may include one or more interfaces to a controller area network (CAN) or to a local interconnect network (LIN). Communication interface 910 may include one or more of a serial peripheral interface (SPI) or an isolated serial peripheral interface (isoSPI). In some embodiments, communication interface 910 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 912 includes hardware, software, or both coupling components of computer system 900 to each other. Bus 912 may include any suitable bus, as well as one or more buses 912, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 9B illustrates example firmware 950 for a vehicle ECU 900 as described with respect to control system 730. Firmware 950 may include functions 952 for analyzing sensor data based on signals received from sensors 710 or cameras 720 received through communication interface 910. Firmware 950 may include functions 954 for processing user input (e.g., directly provided by a driver of or passenger in vehicle 700, or provided through a computing device 750) received through I/O interface 908. Firmware 950 may include functions 956 for logging detected events (which may be stored in storage 906 or uploaded to the cloud), as well as functions for reporting detected events (e.g., to a driver or passenger of the vehicle through an instrument display or interactive interface of the vehicle, or to a vehicle manufacturer, service provider, or third party through communication interface 910). Firmware 950 may include functions 958 for assessing safety parameters (e.g., monitoring the temperature of a vehicle battery or the distance between vehicle 700 and nearby vehicles). Firmware 950 may include functions 960 for transmitting control signals to components of vehicle 700, including other vehicle ECUs 900.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A control system for a learning vehicle, the control system comprising one or more processors and a memory coupled to the processors comprising instructions executable by the processors, the processors being operable when executing the instructions to:

receive a trace of an off-road trail traversed by a precedent vehicle and corresponding trace parameters implemented by the precedent vehicle for each of a plurality of predefined locations along the trace of the off-road trail, the trace parameters comprising at least one of an orientation, a ride height, a drive mode, a brake regeneration level, a steering angle, a power consumption, or a torque;

in response to receiving the trace parameters, adjust one or more driving parameters of the learning vehicle at each of the plurality of predefined locations along the trace of the off-road trail based on the trace parameters, the adjusted one or more driving parameters comprising the ride height, the drive mode, and the brake regeneration level; and provide instructions for traversing the trace based on the trace parameters.

2. The control system of claim 1, wherein the learning vehicle has enabled an advanced driver assistance system, and wherein the adjusted one or more driving parameters further comprise steering angle, acceleration, or torque.

3. The control system of claim 1, wherein adjusting the driving parameters comprises configuring the driving parameters to match the trace parameters of the precedent vehicle based on measurements detected using sensors of the learning vehicle.

4. The control system of claim 3, wherein the sensor measurements from the learning vehicle comprise acceleration, torque, acceleration pedal angle, brake pedal angles, roll, pitch, altitude, heading, or location.

5. The control system of claim 1, wherein the instructions are provided in audio, visual, or haptic format.

6. The control system of claim 5, wherein the visual instructions are displayed on a center display, a heads up display, a driver display, or other visual components of the learning vehicle.

7. The control system of claim 1, wherein receiving the trace comprises downloading the trace to the learning vehicle.

8. The control system of claim 1, wherein receiving the trace comprises receiving a transmission of the trace while the learning vehicle traverses the off-road trail.

9. The control system of claim 1, wherein the trace is uploaded to an online portal while the precedent vehicle traverses the off-road trail or after the precedent vehicle finishes traversing the off-road trail.

10. A method of providing instructions to a learning vehicle, the method comprising:

receiving a trace of an off-road trail traversed by a precedent vehicle and corresponding trace parameters implemented by the precedent vehicle for each of a plurality of predefined locations along the trace of the off-road trail, the trace parameters comprising at least one of an orientation, a ride height, a drive mode, a brake regeneration level, a steering angle, a power consumption, or a torque;

in response to receiving the trace parameters, adjusting one or more driving parameters of the learning vehicle at each of the plurality of predefined locations along the trace of the off-road trail based on the trace parameters, the adjusted one or more driving parameters comprising the ride height, the drive mode, and the brake regeneration level; and providing instructions for traversing the trace based on the trace parameters.

11. The method of claim 10, wherein the learning vehicle has enabled an advanced driver assistance system, and wherein the adjusted one or more driving parameters further comprise steering angle, acceleration, or torque.

12. A non-transitory computer-readable medium storing instructions that, when executed by one or more processors, cause the one or more processors to execute a method comprising:

receiving a trace of an off-road trail traversed by a precedent vehicle and corresponding trace parameters implemented by the precedent vehicle for each of a plurality of predefined locations along the trace of the off-road trail, the trace parameters comprising at least one of an orientation, a ride height, a drive mode, a brake regeneration level, a steering angle, a power consumption, or a torque;

in response to receiving the trace parameters, adjusting one or more driving parameters of a learning vehicle at each of the plurality of predefined locations along the trace of the off-road trail based on the trace parameters, the adjusted one or more driving parameters comprising the ride height, the drive mode, and the brake regeneration level; and providing instructions for traversing the trace based on the trace parameters.

13. The non-transitory computer-readable medium of claim 12, wherein adjusting the driving parameters comprises configuring the driving parameters to match the trace parameters of the precedent vehicle based on measurements detected using sensors of the learning vehicle.

14. The non-transitory computer-readable medium of claim 12, wherein receiving the trace comprises downloading the trace to the learning vehicle.

15. The non-transitory computer-readable medium of claim 12, wherein receiving the trace comprises receiving a transmission of the trace while the learning vehicle traverses the off-road trail.

16. The non-transitory computer-readable medium of claim 12, wherein the trace is uploaded to an online portal while the precedent vehicle traverses the off-road trail or after the precedent vehicle finishes traversing the off-road trail.

* * * * *